US012302998B2

(12) United States Patent
Takazakura et al.

(10) Patent No.: US 12,302,998 B2
(45) Date of Patent: May 20, 2025

(54) TAPE ATTACHMENT

(71) Applicant: YKK CORPORATION, Tokyo (JP)

(72) Inventors: Ryoichiro Takazakura, Kurobe (JP); Kenichi Yoshie, Kurobe (JP)

(73) Assignee: YKK CORPORATION (JP)

( * ) Notice: Subject to any disclaimer, the term of this patent is extended or adjusted under 35 U.S.C. 154(b) by 0 days.

(21) Appl. No.: 18/274,760

(22) PCT Filed: Feb. 5, 2021

(86) PCT No.: PCT/JP2021/004401
§ 371 (c)(1),
(2) Date: Jul. 28, 2023

(87) PCT Pub. No.: WO2022/168280
PCT Pub. Date: Aug. 11, 2022

(65) Prior Publication Data
US 2024/0081490 A1 Mar. 14, 2024

(51) Int. Cl.
*A44B 11/25* (2006.01)
*A44B 11/00* (2006.01)
(Continued)

(52) U.S. Cl.
CPC .......... *A44B 11/266* (2013.01); *A44B 11/005* (2013.01); *G10K 5/00* (2013.01)

(58) Field of Classification Search
CPC ........ A44B 11/266; A44B 11/005; G10K 5/00
See application file for complete search history.

(56) References Cited

U.S. PATENT DOCUMENTS 3,885,250 A * 5/1975 Schiller .................... A41F 9/002 224/163
3,903,547 A * 9/1975 Schiller .................... A41F 9/002 224/163
(Continued)

FOREIGN PATENT DOCUMENTS

CN 204812283 U * 12/2015
JP 3017357 * 10/1995
(Continued)

OTHER PUBLICATIONS

Hayashi, Tsukasa; International Preliminary Report on Patentability for PCT/JP2021/004401, filed Feb. 5, 2021, mailed Aug. 3, 2023, 9 pgs.
(Continued)

*Primary Examiner* — Jack W Lavinder
*Assistant Examiner* — Anna S Rashid
(74) *Attorney, Agent, or Firm* — Taylor English Duma LLP

(57) ABSTRACT

This tape attachment has: one or more crossbar parts that extend along a first direction; a pair of side support parts that support the crossbar parts; and a whistle part provided with a blowing hole and a discharge hole, the whistle part having a hollow section in which the pressure of air guided from the blowing hole is increased, the hollow section being positioned on the downstream side in the air passage direction in relation to the discharge hole, and the hollow section being provided in at least a part of the crossbar parts and the pair of side support parts. It is thereby possible to reduce the size of a tape attachment provided with a whistle function.

9 Claims, 19 Drawing Sheets

(51) Int. Cl.
*A44B 11/26* (2006.01)
*G10K 5/00* (2006.01)

(56) References Cited

U.S. PATENT DOCUMENTS

| | | | | |
|---|---|---|---|---|
| 4,121,375 | A * | 10/1978 | Erickson | A63H 5/00 446/81 |
| D381,936 | S * | 8/1997 | Anscher | D11/216 |
| 5,794,316 | A * | 8/1998 | Anscher | A44B 11/266 24/615 |
| 6,668,428 | B2 * | 12/2003 | Moeller | A44B 11/005 24/198 |
| 8,312,602 | B2 * | 11/2012 | Paik | A44B 11/266 24/163 R |
| 9,659,554 | B1 * | 5/2017 | Determan | G10K 5/00 |
| 9,986,789 | B2 * | 6/2018 | Blackman | A44B 11/2592 |
| 10,219,587 | B1 * | 3/2019 | Chan | A44B 11/04 |
| 11,089,842 | B2 * | 8/2021 | Millward | A44B 11/266 |
| D945,313 | S * | 3/2022 | Millward | D11/216 |
| D1,018,371 | S * | 3/2024 | Millward | D10/119.3 |
| 2002/0029440 | A1 * | 3/2002 | Moeller | A44B 11/001 24/163 R |
| 2009/0178607 | A1 * | 7/2009 | Wu | G10K 5/00 116/137 R |
| 2010/0115736 | A1 * | 5/2010 | Paik | G10K 5/00 24/163 R |
| 2013/0189631 | A1 * | 7/2013 | Mojica | F23Q 1/06 431/274 |
| 2016/0021984 | A1 * | 1/2016 | Mundhra | A44B 11/2565 116/137 R |
| 2019/0200709 | A1 * | 7/2019 | Paik | A44B 11/005 |
| 2020/0397098 | A1 * | 12/2020 | Paik | A44B 11/2588 |

FOREIGN PATENT DOCUMENTS

| | | | | | |
|---|---|---|---|---|---|
| JP | 3017357 | U | | 10/1995 | |
| JP | 3017754 | | * | 11/1995 | |
| JP | 3017754 | U | | 11/1995 | |
| JP | 09022603 | A | * | 1/1997 | G10K 5/00 |
| JP | 10027501 | A | * | 1/1998 | G10K 5/00 |
| JP | 2004264324 | A | * | 9/2004 | G10K 5/00 |
| JP | 2013022373 | A | * | 2/2013 | A44B 11/005 |

OTHER PUBLICATIONS

Hayashi, Tsukasa; International Search Report and Written Opinion for PCT/JP2021/004401, filed Feb. 5, 2021, mailed Apr. 20, 2021, 13 pgs.

* cited by examiner

TAPE ATTACHMENT

TECHNICAL FIELD

The invention relates to a tape attachment attached to at least one tape.

BACKGROUND ART

Tape attachments used by being attached to a tape (including a belt), such as a buckle coupling two tape ends of the tape and an adjuster adjusting a length of the tape, are known. The buckle generally includes a plug and a socket with which the plug is detachably engaged, and can couple and separate the two tape ends. The buckle is attached to the tape of a product such as a helmet, a backpack, and a neck strap.

Among the buckles, for example, the buckle having a whistle function is known that can make a sound in order to easily notify another person of an emergency or a need for rescue during an outdoor activity, such as construction and mountain climbing. Furthermore, as an example of the buckle having the whistle function, U.S. Pat. No. 6,668,428 (Patent Document 1) discloses a buckle 120 with a whistle as illustrated in FIG. 27.

The buckle in Patent Document 1 includes a plug and a socket that can engage with and separate from each other. The socket includes a socket body with which the plug is engaged and that houses the plug, a tape holder to which the tape is attached and that holds the tape, and a whistle part provided between the socket body and the tape holder. The whistle part is provided with a blowing hole through which air (breath) can be blown into the whistle part and a discharge hole through which air is discharged from the inside of the whistle part.

The buckle 120 in Patent Document 1 includes a plug 121 and a socket 122 that can engage with and separate from each other. The socket 122 includes a socket body 122a with which the plug 121 is engaged and that houses the plug 121, a tape holder 122b to which the tape is attached and that holds the tape, and a whistle part 122c provided between the socket body 122a and the tape holder 122b. The whistle part 122c is provided with a blowing hole 122d through which air (breath) can be blown into the whistle part 122c and a discharge hole 122e through which air is discharged from the inside of the whistle part 122c.

In the buckle 120 of Patent Document 1, the whistle part 122c having the blowing hole 122d and the discharge hole 122e is provided between the socket body 122a and the tape holder 122b in a form isolated from the function of the socket body 122a and the function of the tape holder 122b. As a result, since the blowing hole 122d and the discharge hole 122e of the whistle part 122c can be prevented from being covered and blocked by the tape held by the tape holder 122b or the tape held by the plug 121, the whistle part 122c can be stably operated.

CITATION LIST

Patent Document
Patent Document 1: U.S. Pat. No. 6,668,428

SUMMARY OF INVENTION

Technical Problem

In a conventional buckle having the whistle function as in Patent Document 1 and the like, the whistle part exhibiting the whistle function is provided separately from the socket, the plug, and the tape holder that are main parts of the buckle. In addition, the blowing hole and the discharge hole of the whistle part are disposed at positions where the blowing hole and the discharge hole are hardly blocked by the tape. Furthermore, the whistle part itself has also been formed to be relatively large. As a result, the buckle has been increased in size.

The invention has been made in view of the above conventional problems, and an object of the invention is to provide a tape attachment having a whistle function and having a structure that can be made smaller than the conventional tape attachment.

Solution to Problem

In order to achieve the above object, the invention provides a tape attachment attached to at least one tape. The tape attachment includes at least one crossbar part extending along a first direction and brought into contact with the tape, a pair of side support parts connected to both ends of the crossbar part and supporting the crossbar part, and a whistle part having a blowing hole and a discharge hole for air, the whistle part includes a hollow section in which a pressure of air blown in through the blowing hole is increased, the hollow section is disposed on a downstream side of the discharge hole in an air passage direction, and the hollow section is provided in at least a part of the crossbar part and the pair of side support parts.

In the tape attachment according to the invention, it is preferable that the pair of side support parts include inner side edges facing each other in planar view of the tape attachment, the blowing hole and the discharge hole are disposed outside a position of the inner side edge of the side support part in the first direction, and at least a part of the hollow section is provided in at least a part of the side support part.

In addition, it is preferable that a mouthpiece portion protrudes from one of the pair of side support parts, and the mouthpiece portion is provided with the blowing hole and at least a part of the discharge hole.

Furthermore, the hollow section is preferably provided in at least a part of the side support part and at least a part of the crossbar part.

In the tape attachment of the invention, it is preferable that the whistle part is formed by assembling at least two components to each other.

In this case, it is preferable that the whistle part includes a whistle body having the blowing hole and the discharge hole, and a guide member formed separately from the whistle body and assembled to an inside of the whistle body, and the guide member includes an inclined guide portion guiding air blown in through the blowing hole toward the discharge hole.

Furthermore, in this case, it is preferable that the guide member includes at least one engaging protrusion or at least one engaged hole, and the whistle body includes at least one engaged hole with which the engaging protrusion of the guide member is engaged or at least one engaging protrusion engaging with the engaged hole of the guide member.

The tape attachment of the invention is preferably a buckle separably coupling two portions of the tape, or an adjuster capable of adjusting a length of the tape.

Advantageous Effects of Invention

According to the invention, it is possible to provide the tape attachment having a whistle function and having a structure that can be made smaller than a conventional tape attachment.

DESCRIPTION OF EMBODIMENTS

Hereinafter, embodiments of the invention will be described using examples with reference to the drawings. Note that the invention is not limited to the embodiments described below, and various modifications can be made as long as they have substantially the same configuration as the invention and exhibit the same operational effects.

In the invention, a tape attachment is a member that is attached to at least one tape in a product such as a helmet, a backpack, and clothing, and is used for coupling the tape, adjusting a length of the tape, or the like. For example, the tape attachment includes a buckle that separably couples two tape ends provided on one or two tapes, an adjuster that is attached to one or two tapes and can adjust a length of the tape, and the like.

In addition, the tape means the member having a flat and elongated belt-like shape and having flexibility. For example, the tape includes a belt-like woven fabric, a belt-like knitted fabric, a belt formed of natural leather or synthetic leather, and the like.

In the following description of the tape attachment, a front-back direction means a direction along a longitudinal direction of the tape when the tape to which the tape attachment is attached is pulled straight. The front-back direction can be restated as a longitudinal direction of the tape attachment. When the tape attachment is the buckle, a direction in which a plug of the buckle approaches a socket is defined as front direction, and a direction in which the plug separates from the socket is defined as back direction.

An upper-lower direction means an obverse-reverse direction of the tape when the tape is pulled as described above. When the tape attachment attached to the tape has a surface facing outward, a direction facing outward is defined as upper direction, and an opposite direction is defined as lower direction. The upper-lower direction can be restated as a thickness direction of the tape attachment.

A left-right direction means a direction orthogonal to the above-described front-back direction and upper-lower direction. In particular, in a case of the invention, the left-right direction means a direction in which a crossbar part provided for winding the tape around the tape attachment or pressing the tape on the tape attachment extends. The left-right direction can be restated as a width direction of the tape attachment.

Figure 2:
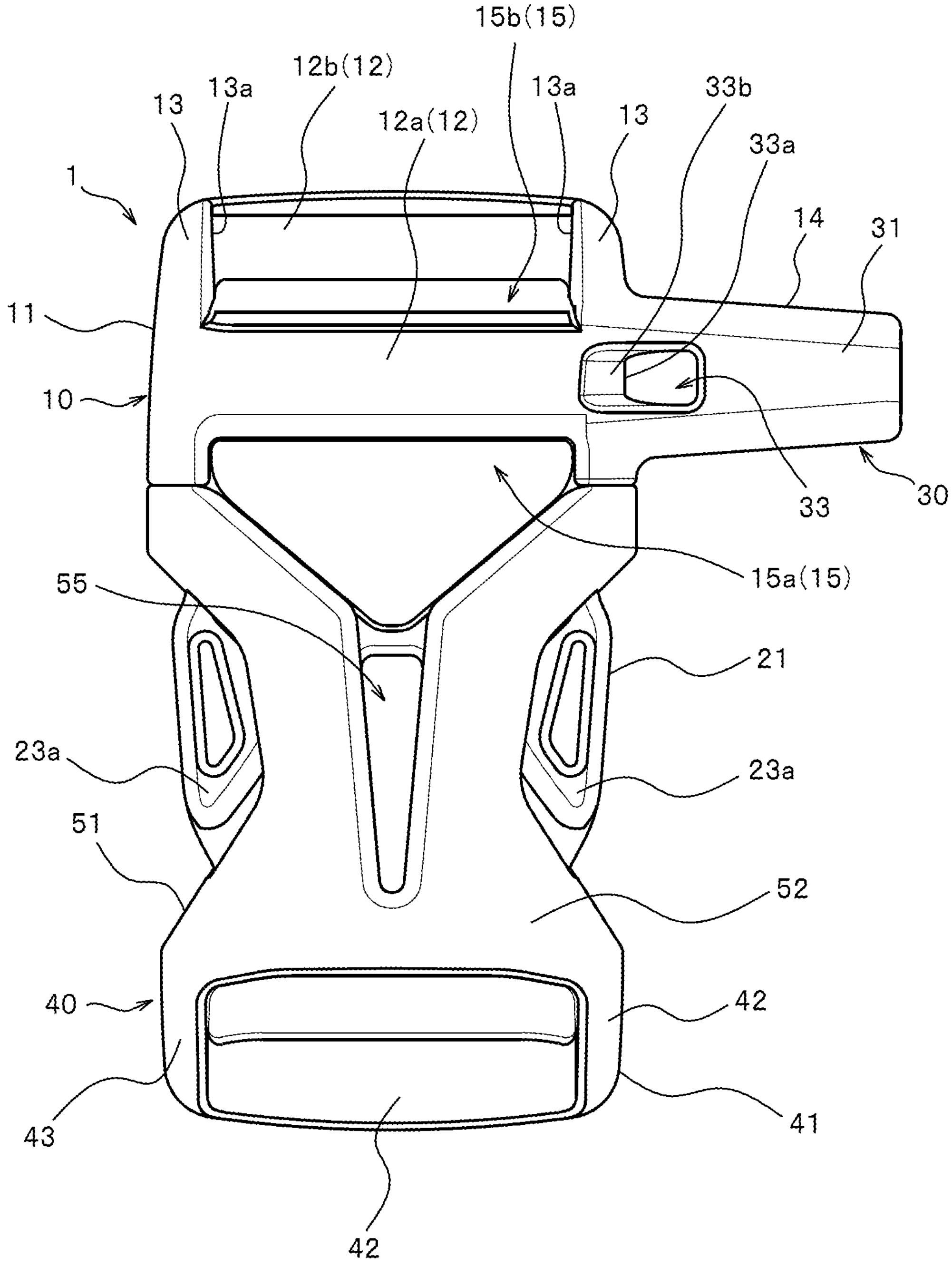
FIG. 2 is a plan view of the tape attachment illustrated in FIG. 1.
Figure 21:
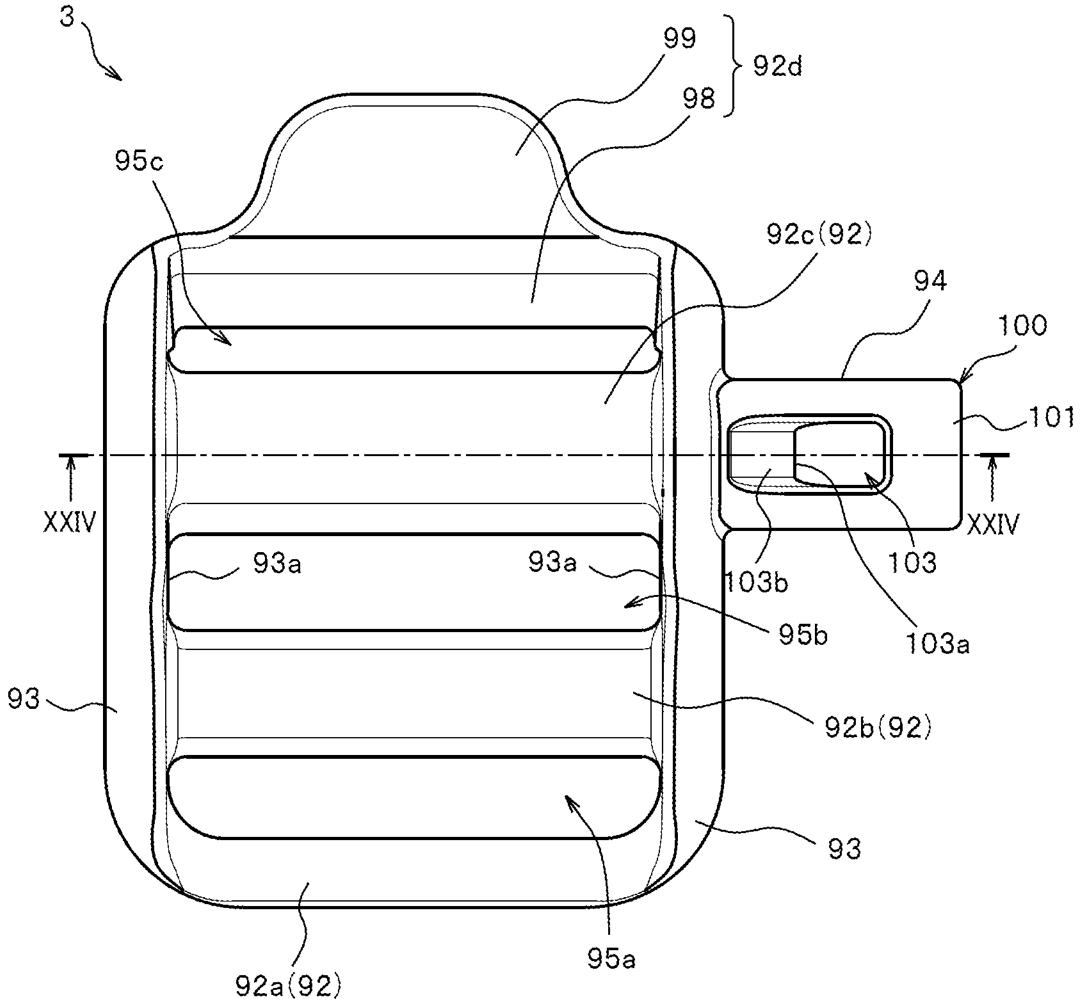
FIG. 21 is a plan view of the tape attachment illustrated in FIG. 20.

More specifically with reference to the drawings, the front-back direction, the upper-lower direction, and the left-right direction of the tape attachment correspond to the upper-lower direction, the obverse-reverse direction, and the left-right direction on the planes of FIGS. 2 and 21 illustrating the tape attachment, respectively. Note that in the invention, the left-right direction in which the crossbar part extends may be referred to as a first direction, and a direction orthogonal to the first direction in planar view of the tape attachment (e.g., a direction in which the plug approaches or separates from the socket) may be referred to as a second direction.

First Embodiment

Figure 1:
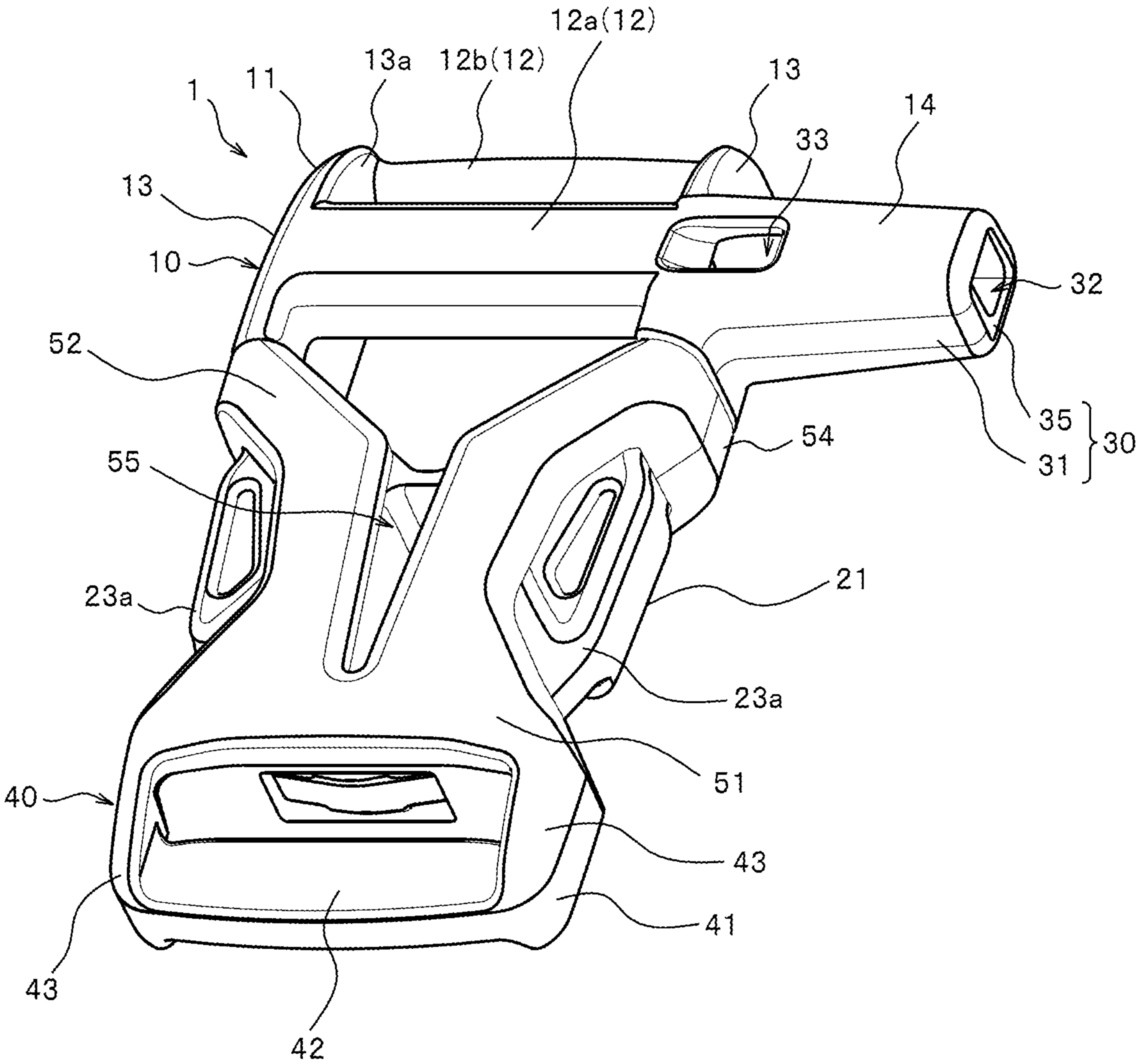
FIG. 1 is a perspective view schematically illustrating a tape attachment (buckle) according to a first embodiment of the invention.
Figure 3:
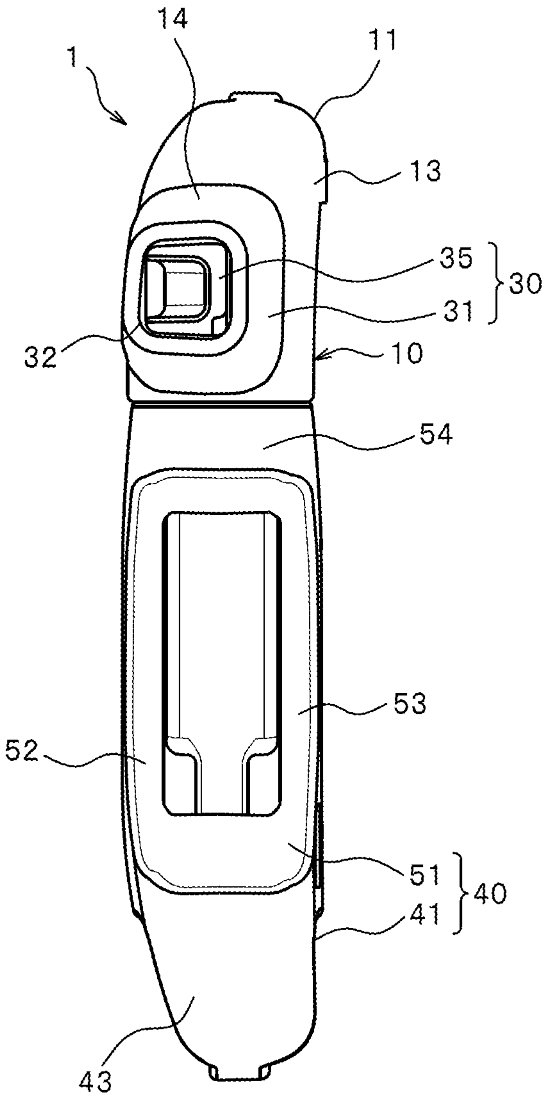
FIG. 3 is a side view of the tape attachment illustrated in FIG. 1.
Figure 4:
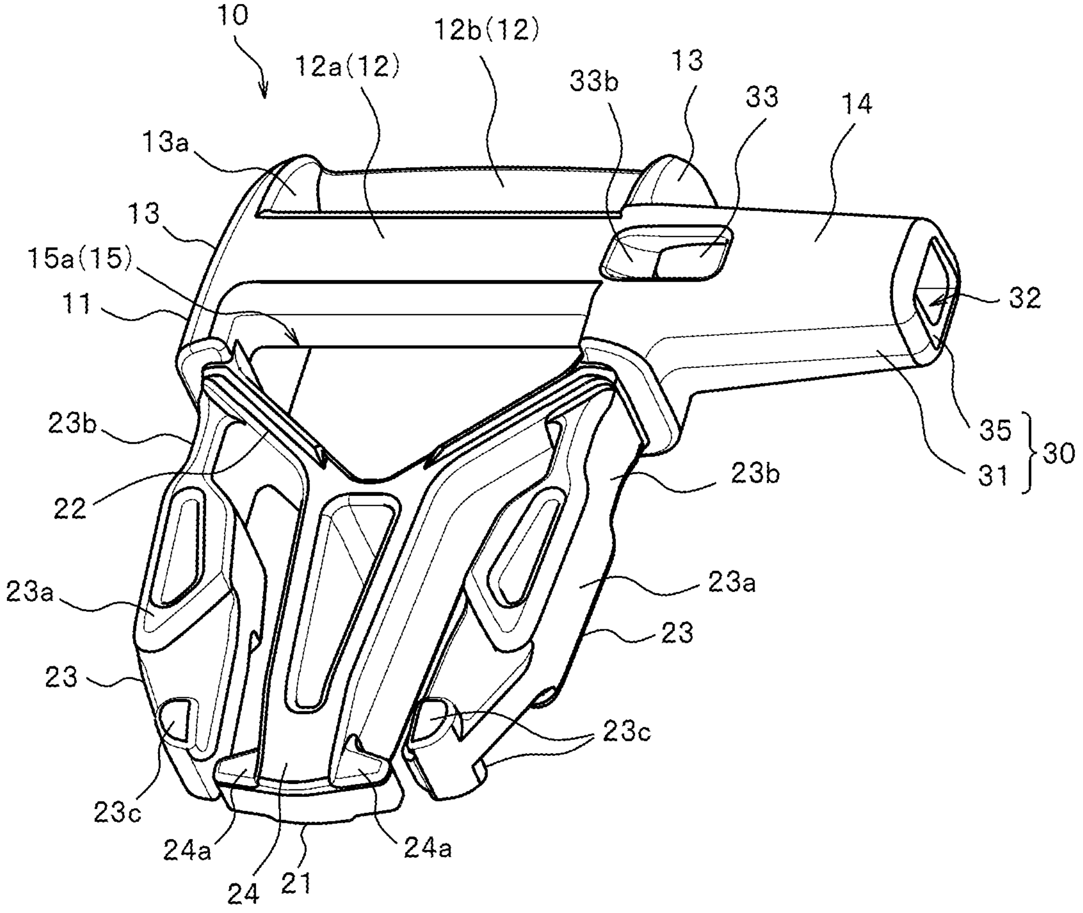
FIG. 4 is a perspective view schematically illustrating a plug in the tape attachment of the first embodiment.

FIGS. 1 to 3 are a perspective view, a plan view, and a side view schematically illustrating a buckle (tape attachment) of a first embodiment. FIGS. 4 to 9 are schematic views of a plug in the buckle of the first embodiment as viewed from various directions.

A tape attachment 1 of the first embodiment is a buckle 1 that separably couples two tape ends provided on one tape or tape ends of two tapes.

The buckle (tape attachment) 1 of the first embodiment includes a plug 10 attached to a tape (not illustrated) and a socket 40 attached to a tape (not illustrated), and has a structure in which the plug 10 is detachably engaged with and is housed in the socket 40. The plug 10 and the socket 40 are formed of a thermoplastic resin such as polyacetal, polyamide, and polypropylene. Note that materials of the tape attachment are not limited in the invention.

As illustrated in FIGS. 4 to 9, the plug 10 of the first embodiment includes a plug-side tape holder 11 to which the tape is attached and that holds the tape, and an engaging part 21 extending forward (to one side in the second direction) from the plug-side tape holder 11. In this case, the plug-side tape holder 11 is formed of a portion of the plug 10 that is not housed in the socket 40.

In the plug-side tape holder 11, a whistle part 30 that generates a sound by blowing air is provided integrally with the plug-side tape holder 11 using a part of a shape necessary for holding the tape in the plug-side tape holder 11. As described later, the whistle part 30 is formed by assembling a guide member 35 illustrated in FIG. 11 to the inside of a whistle body 31 described later of the plug 10.

The plug-side tape holder 11 includes two crossbar parts 12 extending along the width direction, a pair of left and right side support parts 13 to which left and right ends of each crossbar part 12 are connected, a mouthpiece portion (blowing part) 14 protruding outward (rightward) in the width direction from one (the right) side support part 13, and two tape insertion slots 15 formed between the left and right side support parts 13.

The crossbar parts 12 of the first embodiment include a first crossbar part 12*a* disposed on a side close to the engaging part 21 and a second crossbar part 12*b* disposed on a side away from the engaging part 21. The tape insertion slots 15 include a first tape insertion slot 15*a* provided between the engaging part 21 and the first crossbar part 12*a*, and a second tape insertion slot 15*b* provided between the first crossbar part 12*a* and the second crossbar part 12*b*.

The first crossbar part 12*a* and the second crossbar part 12*b* are formed straight along the width direction and are disposed parallel to each other. The first crossbar part 12*a* and the second crossbar part 12*b* are disposed such that positions in the longitudinal direction and positions in the thickness direction are different from each other. In this case, the first crossbar part 12*a* is disposed above (on an outer surface side of) the second crossbar part 12*b*.

Since each of the first crossbar part 12*a* and the second crossbar part 12*b* has the left and right ends (one end and the other end) connected and fixed to the left and right side support parts 13, the first crossbar part 12*a* and the second crossbar part 12*b* are supported by the left and right side support parts 13. In the plug-side tape holder 11 of the first embodiment, a part of the tape is wound in contact with the first crossbar part 12*a*. In addition, two tape portions of the tape folded back at the first crossbar part 12*a* are passed through a lower surface side of the second crossbar part 12*b*, whereby the tape comes into contact with a lower surface portion of the second crossbar part 12*b*. As a result, the tape is held by the plug-side tape holder 11. The length of the tape can be adjusted by changing a position of the tape wound around the first crossbar part 12*a*.

In the invention, a length dimension (dimension in the longitudinal direction) and a thickness dimension (dimension in the thickness direction) of each crossbar part 12 are not particularly limited. Connecting positions of each crossbar part 12 connected to the left and right side support parts 13 are also not particularly limited. In addition, for example, at least one of the first crossbar part 12*a* and the second crossbar part 12*b* may be rotatably supported by the side support parts 13 about a rotation axis by being connected to the left and right side support parts 13 via the rotation axis. Furthermore, the plug-side tape holder 11 may include not the two crossbar parts 12 but only one crossbar part 12 or three or more crossbar parts 12.

In the first crossbar part 12*a* of the first embodiment, an internal space 19 forming a part of a hollow section 34 described later of the whistle part 30 is continuously formed along the width direction (see FIG. 9). The internal space 19 of the first crossbar part 12*a* communicates with an internal space 19 provided in the right side support part 13. The internal space 19 of the first crossbar part 12*a* is formed continuously up to a position of an inner side edge 13*a* (inner side surface) of the left side support part 13 in the width direction (first direction). The second crossbar part 12*b* is formed solid without an internal space 19.

The left and right side support parts 13 are disposed at positions separated from each other in the width direction, and are formed in parallel to each other along the longitudinal direction orthogonal to the width direction (i.e., the second direction orthogonal to the first direction). The left and right side support parts 13 are provided from a position of a front end portion of the first tape insertion slot 15*a* to a position of a rear end portion of the second crossbar part 12*b* in the longitudinal direction. That is, the side support parts 13 support the first crossbar part 12*a* and the second crossbar part 12*b* in the plug 10, and are portions continuously formed over a range in the longitudinal direction in which the first tape insertion slot 15*a*, the first crossbar part 12*a*, the second tape insertion slot 15*b*, and the second crossbar part 12*b* are formed.

Figure 5:
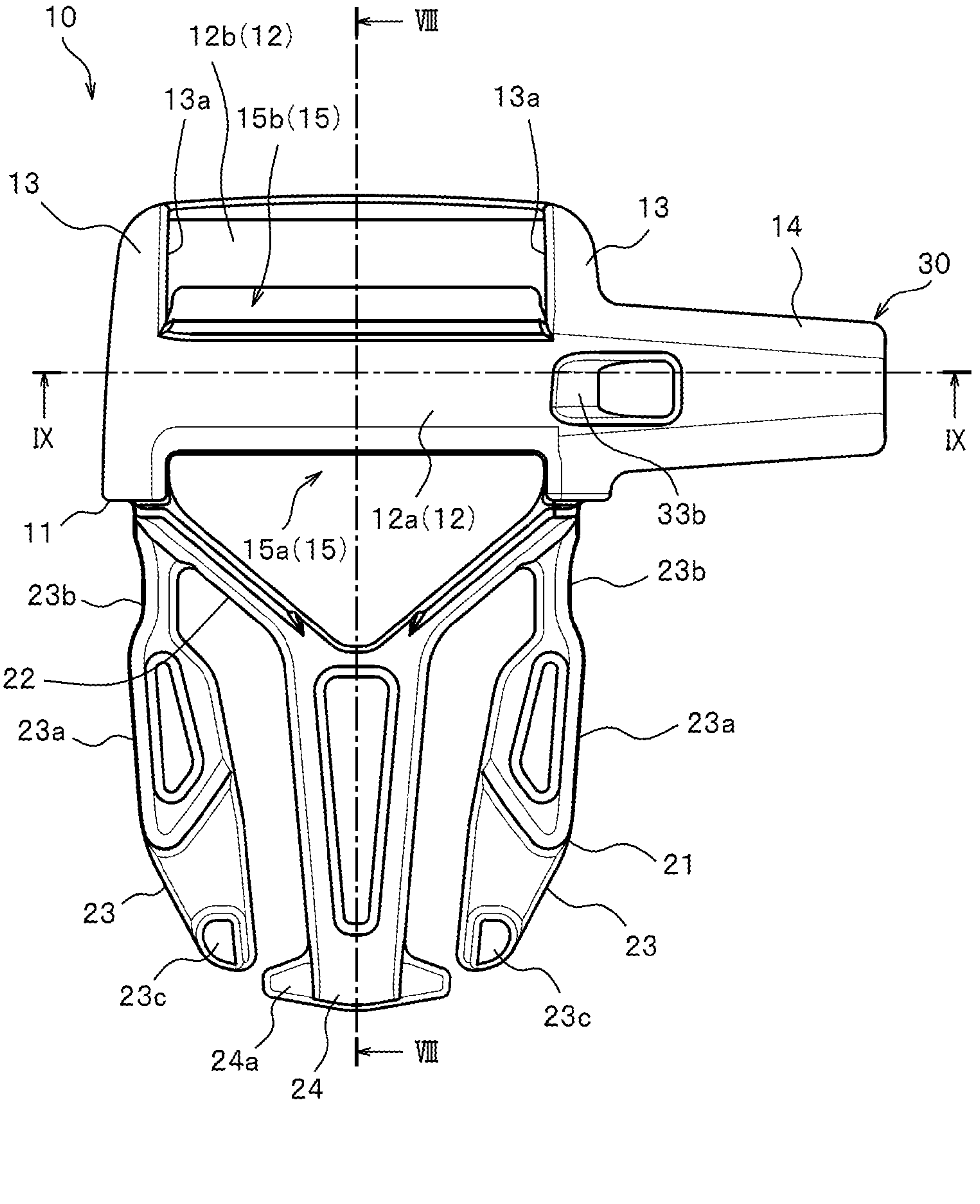
FIG. 5 is a plan view of the plug illustrated in FIG. 4.
Figure 6:
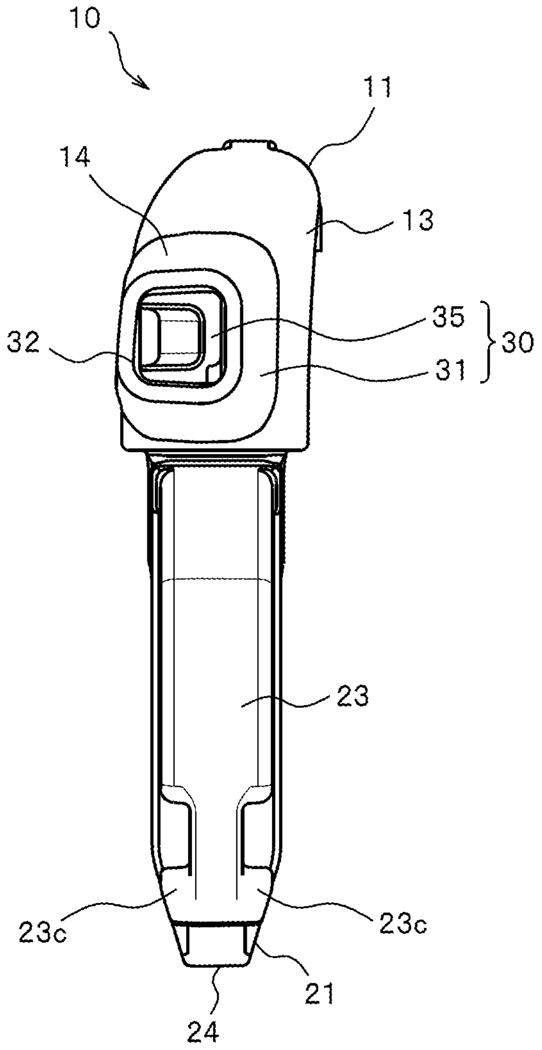
FIG. 6 is a side view of the plug illustrated in FIG. 4.
Figure 7:
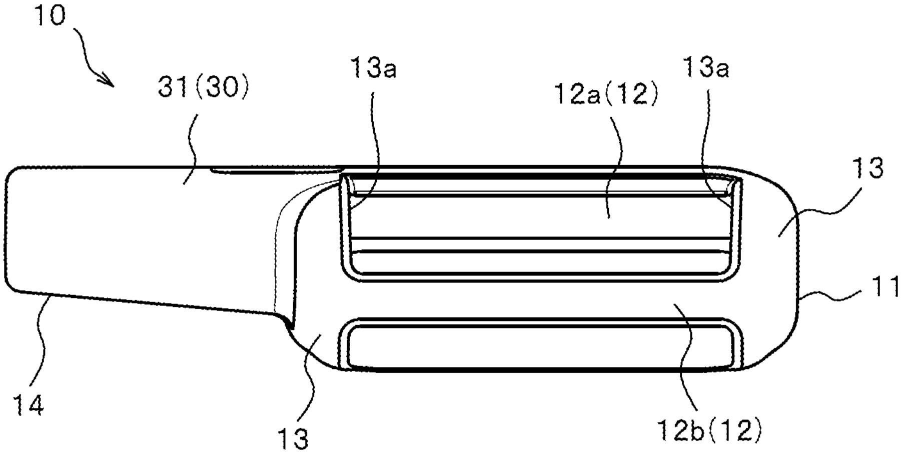
FIG. 7 is a schematic view (rear view) of the plug illustrated in FIG. 4 as viewed from one side in a front-back direction.
Figure 8:
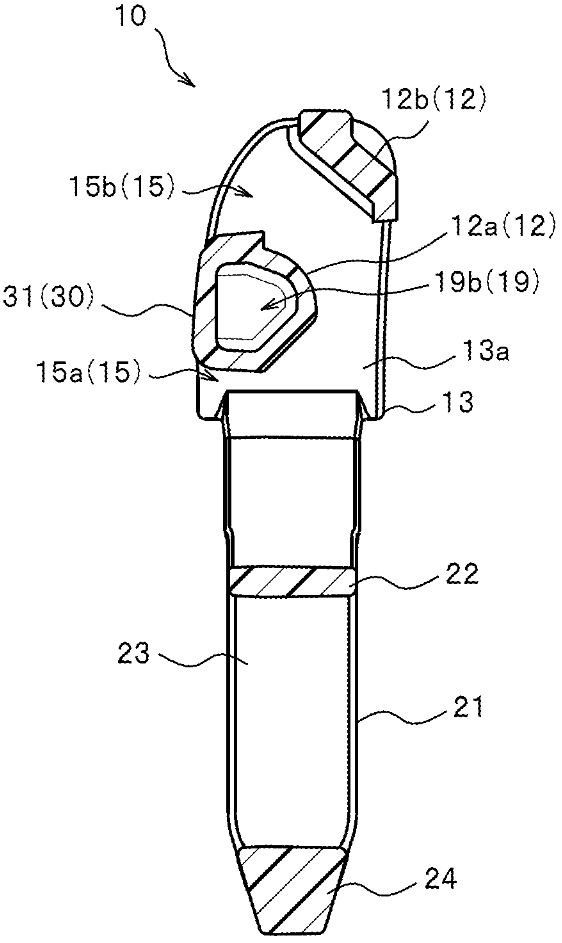
FIG. 8 is a cross-sectional view taken along line VIII-VIII in FIG. 5.

The left and right side support parts 13 have inner side edges (inner side surfaces) 13*a* facing each other and outer edges (outer side surfaces) facing outward in the width direction in planar view of the plug 10 (FIG. 5). The internal space 19 is provided in the right side support part 13. The left side support part 13 is formed solid without an internal space 19.

The mouthpiece portion 14 protrudes outward (rightward) in the width direction from the right side support part 13. The mouthpiece portion 14 includes a base end portion connected to the side support part 13 and a tip end portion disposed farthest from the side support part 13, and has a shape tapered outward in the width direction such that the tip end portion is thinner than the base end portion. The mouthpiece portion 14 protrudes rightward from a position opposite in the width direction to a connecting position where the first crossbar part 12*a* is connected to the side support part 13. As a result, as described later, an internal space 19 provided in the mouthpiece portion 14, the internal space 19 provided in the right side support part 13, and the internal space 19 provided in the first crossbar part 12*a* can stably communicate with each other.

In this case, in planar view of the plug 10 (FIG. 5), a length dimension of a connecting region where the first crossbar part 12*a* is connected to the right side support part 13 is smaller than a length dimension of the base end portion of the mouthpiece portion 14, and the connecting region of the first crossbar part 12*a* is included within a formation range of the base end portion of the mouthpiece portion 14 in the longitudinal direction.

Figure 10:
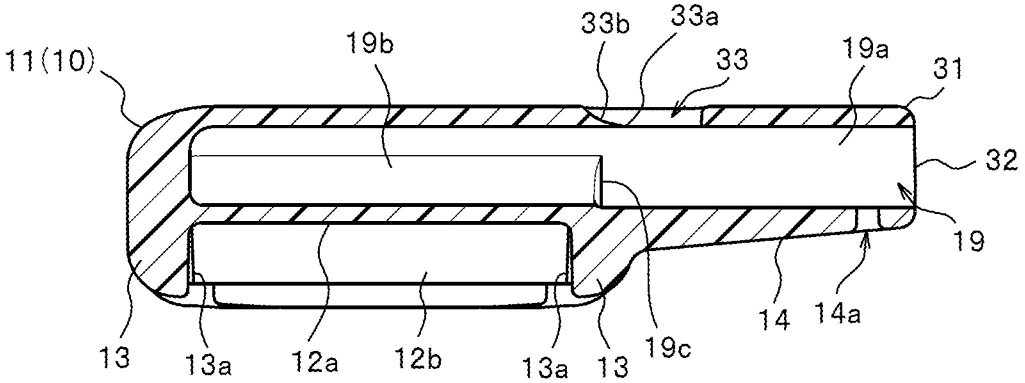
FIG. 10 is a cross-sectional view illustrating the plug in a state where a guide member is removed.
Figure 11:
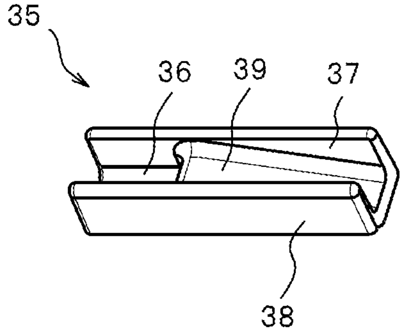
FIG. 11 is a perspective view schematically illustrating the guide member of the first embodiment.

A blowing hole 32 for blowing air into the whistle part 30 is formed at the tip end portion of the mouthpiece portion 14. The blowing hole 32 opens outward in the width direction. As illustrated in FIG. 10, the mouthpiece portion 14 and the right side support part 13 are provided with the internal space 19 that communicates with the blowing hole 32 of the mouthpiece portion 14 and the internal space 19 of the first crossbar part 12*a* along the width direction. The guide member 35 illustrated in FIG. 11 is mounted in the internal space 19 of the mouthpiece portion 14 and the side support part 13.

A discharge hole 33 that discharges air blown in through the blowing hole 32 is provided on an upper surface portion of the mouthpiece portion 14 and an upper surface portion of the right side support part 13. The discharge hole 33 is formed over both the mouthpiece portion 14 and the right side support part 13, and communicates with the internal space 19 provided in the mouthpiece portion 14 and the right side support part 13. Since the discharge hole 33 is provided on the upper surface portions of the mouthpiece portion 14 and the side support part 13, a user who uses the buckle 1 of the first embodiment can easily recognize that the buckle 1 has a whistle function.

The discharge hole 33 is provided with an edge portion 33*a* that divides a flow of air blown in through the blowing hole 32 into upper and lower portions, and an inclined surface 33*b* inclined along the width direction from the edge portion 33*a*. In this case, the edge portion 33*a* is disposed at a boundary portion between an inner wall surface surrounding the internal space 19 in the whistle part 30 and the inclined surface 33*b*. More specifically, the edge portion 33*a* is formed in a portion close to the first crossbar part 12*a* in an opening edge on an inner wall side of the discharge hole 33 (i.e., a portion on a downstream side in the air passage direction).

Figure 9:
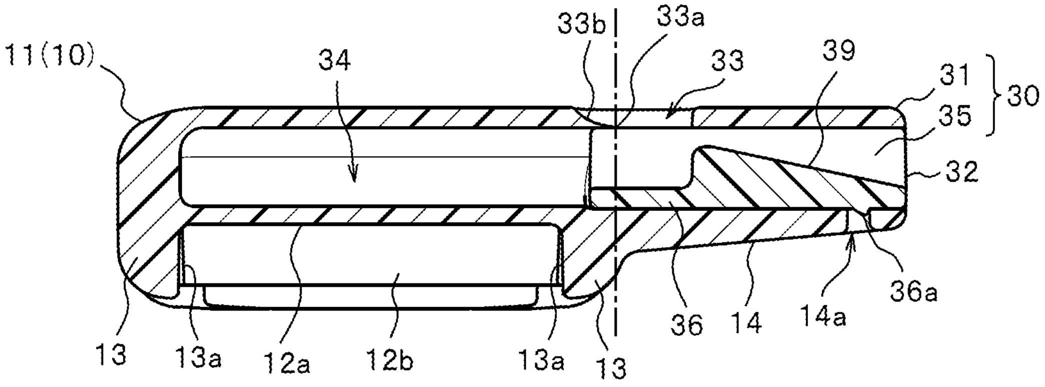
FIG. 9 is a cross-sectional view taken along line IX-IX in FIG. 5.

The inclined surface 33*b* of the discharge hole 33 is inclined upward from the edge portion 33*a* toward the inside in the width direction of the plug 10 (see FIGS. 9 and 10). The inclined surface 33*b* is provided in a range in the width direction between a position of the inner side edge (inner side surface) 13*a* and a position of the outer side edge (outer side surface) in the right side support part 13 in planar view of the plug 10 (FIG. 5). The inclined surface 33*b* of the discharge hole 33 is formed as a curved surface slightly curved in a concave shape from the edge portion 33*a* to the upper surface of the side support part 13.

An engaged hole 14*a* with which an engaging protrusion 36*a* described later of the guide member 35 is engaged is provided on a lower surface portion of the mouthpiece portion 14. By fitting the engaging protrusion 36*a* of the guide member 35 into the engaged hole 14*a*, the guide member 35 is assembled (fixed) at a predetermined position in the internal space 19 of the mouthpiece portion 14 and the side support part 13.

The whistle part 30 provided on the plug-side tape holder 11 includes the whistle body 31 having the internal space 19 and the guide member 35 assembled to the whistle body 31.

The whistle body 31 of the first embodiment is formed of the first crossbar part 12*a* of the plug-side tape holder 11, a part of the right side support part 13, and the mouthpiece portion 14 as an outer frame portion of the whistle part 30. The blowing hole 32 and the discharge hole 33 described above are provided in the whistle body (outer frame portion) 31. In the first embodiment, the blowing hole 32 and the discharge hole 33 (in particular, the edge portion 33*a* of the discharge hole 33) of the whistle body 31 are provided outside the position of the inner side edge 13*a* of the right side support part 13 in the width direction. As a result, when the tape is held by the plug-side tape holder 11 of the plug 10 as described above, the blowing hole 32 and the discharge hole 33 provided on the plug 10 can hardly be covered and blocked by the tape.

As illustrated in FIG. 10, the internal space 19 is formed continuously with the first crossbar part 12*a*, the side support parts 13, and the mouthpiece portion 14 along the width direction in the whistle body 31. The internal space 19 of the whistle body 31 includes a first space 19*a* disposed on a blowing hole 32 side and a second space 19*b* disposed on a back side of the first space 19*a* (downstream side in the air passage direction). A stepped part 19*c* is formed as a boundary between the first space 19*a* and the second space 19*b*.

The first space 19*a* of the whistle body 31 is a space (housing space) that the guide member 35 is inserted into and housed in. In addition, a part of the hollow section 34 described later of the whistle part 30 is formed of the first space 19*a*. The second space 19*b* of the whistle body 31 is provided farther from the blowing hole 32 in the width direction than the first space 19*a*. The second space 19*b* forms the hollow section 34 of the whistle part 30 together with a part of the first space 19*a*. In this case, the stepped part 19*c* as the boundary between the first space 19*a* and the second space 19*b* is provided on a part of the inner wall surface surrounding the internal space 19 in cross-sectional view orthogonal to the width direction of the whistle body 31 (not illustrated). When the guide member 35 is assembled to the whistle body 31, the stepped part 19*c* abuts one end portion of the guide member 35.

As illustrated in FIG. 11, the guide member 35 includes a bottom surface portion 36 being long in the width direction, a front wall portion 37 and a rear wall portion 38 rising from a front end portion and a rear end portion of the bottom surface portion 36, respectively, an inclined guide portion 39 formed between the front wall portion 37 and the rear wall portion 38, and the engaging protrusion 36*a* (see FIG. 9) protruding downward on a lower surface of the bottom surface portion 36. The front wall portion 37 and the rear wall portion 38 of the guide member 35 are formed over the entire bottom surface portion 36 in the width direction. A width dimension (dimension in the width direction) of an entire of the guide member 35 is the same as a width dimension of the first space 19*a* of the whistle body 31. That is, the width dimension of the guide member 35 is the same as a width dimension from the blowing hole 32 to the stepped part 19*c* of the whistle body 31.

As illustrated in FIG. 9, the inclined guide portion 39 of the guide member 35 has an inclined surface inclined upward from the blowing hole 32 toward the discharge hole 33 of the whistle body 31. The inclined surface of the inclined guide portion 39 has a constant inclination angle with respect to the width direction. For example, in the first embodiment, the inclined surface of the inclined guide portion 39 is formed at an inclination angle at which the edge portion 33*a* of the discharge hole 33 is positioned on an extension line obtained by virtually extending the inclined surface straight. Since the inclined guide portion 39 is provided in the guide member 35, air blown in through the blowing hole 32 can be guided toward the discharge hole 33, and a flow velocity of air flowing on the inclined guide portion 39 can be increased. The engaging protrusion 36*a* of the guide member 35 is formed to have a size capable of fixing the guide member 35 by being fitted into the engaged hole 14*a* provided on the lower surface portion of the mouthpiece portion 14.

The whistle part 30 of the first embodiment is provided with the hollow section (resonance chamber) 34 into which air divided by the edge portion 33*a* of the discharge hole 33 flows to increase a pressure of the air when the air is blown in through the blowing hole 32 of the whistle part 30. In this case, the hollow section 34 of the whistle part 30 is formed of a portion of the internal space 19 of the whistle part 30

(i.e., the internal space 19 of the first crossbar part 12*a*, the side support part 13, and the mouthpiece portion 14) on a downstream side of a position of the edge portion 33*a* with the position of the edge portion 33*a* of the discharge hole 33 as a boundary with respect to the passage direction of the blown air. In other words, the hollow section 34 of the first embodiment is formed of a part of the internal space 19 provided in the right side support part 13 and the entire of internal space 19 provided in the first crossbar part 12*a*.

Since the hollow section 34 of the whistle part 30 is provided in this manner, in a case that air is blown in through the blowing hole 32, (A) when a pressure in the hollow section 34 is low, a pressure of the air is increased in the hollow section 34 by allowing the air divided to a hollow section 34 side at the edge portion 33*a* of the discharge hole 33 to flow in, (B) when the pressure in the hollow section 34 is increased, the pressure in the hollow section 34 is decreased by discharging the air divided to an outside at the edge portion 33*a* of the discharge hole 33 together with the air in the hollow section 34, and the above (a) and (b) are alternately repeated. Resonance occurs by alternately repeating the flow of the air in (A) and the flow of the air in (B) as described above, whereby a sound can be smoothly generated in the whistle part 30.

In particular, in the first embodiment, since the hollow section 34 of the whistle part 30 is provided in the entire first crossbar part 12*a* and a part of the side support part 13 in the width direction, a volume of the hollow section 34 is largely secured. As a result, when the air is blown in through the blowing hole 32, it is possible to easily generate a sound of 3 kHz to 4 kHz, which is relatively easy for a person to hear, in the whistle part 30.

As described above, the whistle part 30 of the first embodiment is formed by inserting and assembling the guide member 35 into the first space 19*a* of the whistle body 31 from the blowing hole 32. At this time, one end portion (left end portion) in the width direction of the bottom surface portion 36, the front wall portion 37, and the rear wall portion 38 of the guide member 35 abuts the stepped part 19*c* of the whistle body 31, and the engaging protrusion 36*a* of the guide member 35 is fitted into the engaged hole 14*a* provided on the lower surface portion of the mouthpiece portion 14. As a result, the guide member 35 is fixed to a predetermined position in the whistle body 31.

By attaching the guide member 35 to the whistle body 31 serving as the outer frame portion in this manner, the whistle part 30 can be easily formed with a simple operation. In addition, the hollow section 34 capable of increasing a pressure of air, the discharge hole 33 having the edge portion 33*a*, and the inclined guide portion 39 that guides air toward the discharge hole 33 can be easily provided in the whistle part 30. Therefore, the buckle 1 can stably have the function of the whistle. Furthermore, in this case, since molds used for molding each of the whistle body 31 and the guide member 35 can be formed with a relatively simple structure, manufacturing costs of the buckle 1 can be reduced.

In the first embodiment, the engaging part 21 of the plug 10 includes an engaging body 22 connected to the plug-side tape holder 11, a pair of left and right leg portions 23 extending forward from the engaging body 22, and a plug guide portion 24 that is disposed between the left and right leg portions 23 and guides an inserting direction of the plug 10 when the plug 10 is inserted into the socket 40. The engaging body 22 extends forward from the left and right side support parts 13 in the plug-side tape holder 11, and has a substantially V-shape in planar view of the plug 10 (FIG. 5).

The left and right leg portions 23 have a symmetrical shape in the width direction. Each of the left and right leg portions 23 includes an operation portion 23*a* pressed when the plug 10 is removed from the socket 40, and a narrow width portion 23*b* connecting the operation portion 23*a* and the engaging body 22, and is formed to be elastically deformable so that the operation portion 23*a* moves at least inward in the width direction. An engaging protrusion 23*c* to be engaged with the socket 40 protrudes upward and downward at a tip end portion of the operation portion 23*a*.

The plug guide portion 24 extends forward from a tip end portion (central portion in the width direction) of the engaging body 22. The plug guide portion 24 is disposed between the left and right leg portions 23. In addition, the plug guide portion 24 is separated from each of the left leg portion 23 and the right leg portion 23 such that gaps are formed between the left and right leg portions 23 and the plug guide portion 24. A tip end portion of the plug guide portion 24 protrudes more forward than the left and right leg portions 23, and left and right protrusion portions 24*a* protruding in the width direction are provided at the tip end portion of the plug guide portion 24.

The socket 40 of the first embodiment includes a socket-side tape holder 41 to which the tape is attached and that holds the tape, and a housing portion 51 extending rearward from the socket-side tape holder 41. The socket-side tape holder 41 includes a crossbar part 42 extending along the width direction, and a pair of left and right side support parts 43 to which left and right end portions of the crossbar part 42 are connected.

The housing portion 51 of the socket 40 includes an upper plate portion 52, a lower plate portion 53 disposed away from the upper plate portion 52, and left and right side wall portions 54 connecting the upper plate portion 52 and the lower plate portion 53. A housing space that the engaging part 21 of the plug 10 can be inserted into and housed in is formed between the upper plate portion 52 and the lower plate portion 53. The upper plate portion 52 and the lower plate portion 53 have a substantially Y-shape in planar view or bottom view of the socket 40. A slit 55 extending rearward is provided at a central portion in the width direction of the upper plate portion 52 and the lower plate portion 53. Insertion recess portions (not illustrated) into which the engaging protrusions on an upper surface side provided in the leg portion 23 of the plug 10 are inserted are provided on an inner surface portion of the upper plate portion 52 disposed facing the lower plate portion 53. Insertion hole portions (not illustrated) into which the engaging protrusions on a lower surface side provided in the leg portion 23 of the plug 10 are inserted are provided on an inner surface portion of the lower plate portion 53 disposed facing the upper plate portion 52.

Note that in the first embodiment, a form of the engaging part 21 of the plug 10 and a form of the housing portion 51 of the socket 40 are not particularly limited. The engaging part of the plug and the housing portion of the socket in the invention may be formed in a form capable of detachably engaging the plug with the socket.

According to the buckle 1 of the first embodiment having the plug 10 and the socket 40 described above, since the whistle part 30 is provided in the plug-side tape holder 11 of the plug 10, it is possible to easily and smoothly generate a sound from the whistle part 30 by blowing air in through the blowing hole 32 of the whistle part 30.

Furthermore, in the buckle 1 of the first embodiment, air can be easily blown in thorough the blowing hole 32 of the whistle part 30 both in a state where the plug 10 is engaged with the socket 40 and in a state where the plug 10 is not engaged with the socket 40. In addition, since the blowing hole 32 and the discharge hole 33 of the whistle part 30 are disposed outside the position of the inner side edge 13*a* of the side support part 13 in the width direction, the blowing hole 32 and the discharge hole 33 can hardly be blocked by the tape held at the plug-side tape holder 11 and the tape held at the socket-side tape holder 41. Therefore, when air is blown into the whistle part 30, a sound can be smoothly generated.

In addition, in the buckle 1 of the first embodiment, the hollow section 34 necessary for generating the sound in the whistle part 30 is provided in the first crossbar part 12*a* and the side support part 13 necessary for holding the tape at the plug 10. That is, the whistle part 30 is formed by effectively using a shape essential as a function of the buckle 1. Therefore, since the buckle 1 of the first embodiment can be formed in a smaller size than the conventional buckle (tape attachment) as in Patent Document 1 in which, for example, the whistle part is added separately from the function of the buckle, it is possible to downsize the buckle 1 having the whistle function (in particular, downsize the buckle 1 in the longitudinal direction).

Note that in the first embodiment, in order to fix the guide member 35 illustrated in FIG. 11 to the whistle body 31, as described above, the engaging protrusion 36*a* is provided on the bottom surface portion 36 of the guide member 35, and the engaged hole 14*a* into which the engaging protrusion 36*a* is fitted is provided on the lower surface portion of the whistle body 31 (mouthpiece portion 14). However, in the invention, for example, the engaging protrusion may be provided on at least one of the front wall portion and the rear wall portion of the guide member, and the engaged hole may be provided in a portion of the whistle body corresponding to the engaging protrusion. In addition, the engaging protrusion may be provided in the whistle body, and the engaged hole may be provided in the guide member. Furthermore, in the invention, a method and means for fixing the guide member 35 in the whistle body 31 are not limited, and the guide member 35 may be fixed in the whistle body 31 by, for example, adhesion, welding, or the like.

In the first embodiment, the whistle part 30 is formed in the first crossbar part 12*a* of the plug-side tape holder 11. However, in the first embodiment, the whistle part may be formed in the second crossbar part 12*b* of the plug-side tape holder 11 or the crossbar part 42 of the socket-side tape holder 41. In addition, in the first embodiment, the whistle part 30 may be provided in each of two or more crossbar parts 12 and 42 among the first crossbar part 12*a* and the second crossbar part 12*b* of the plug-side tape holder 11 and the crossbar part 42 of the socket-side tape holder 41. That is, two or more whistle parts may be provided for one buckle.

Second Embodiment

Figure 12:
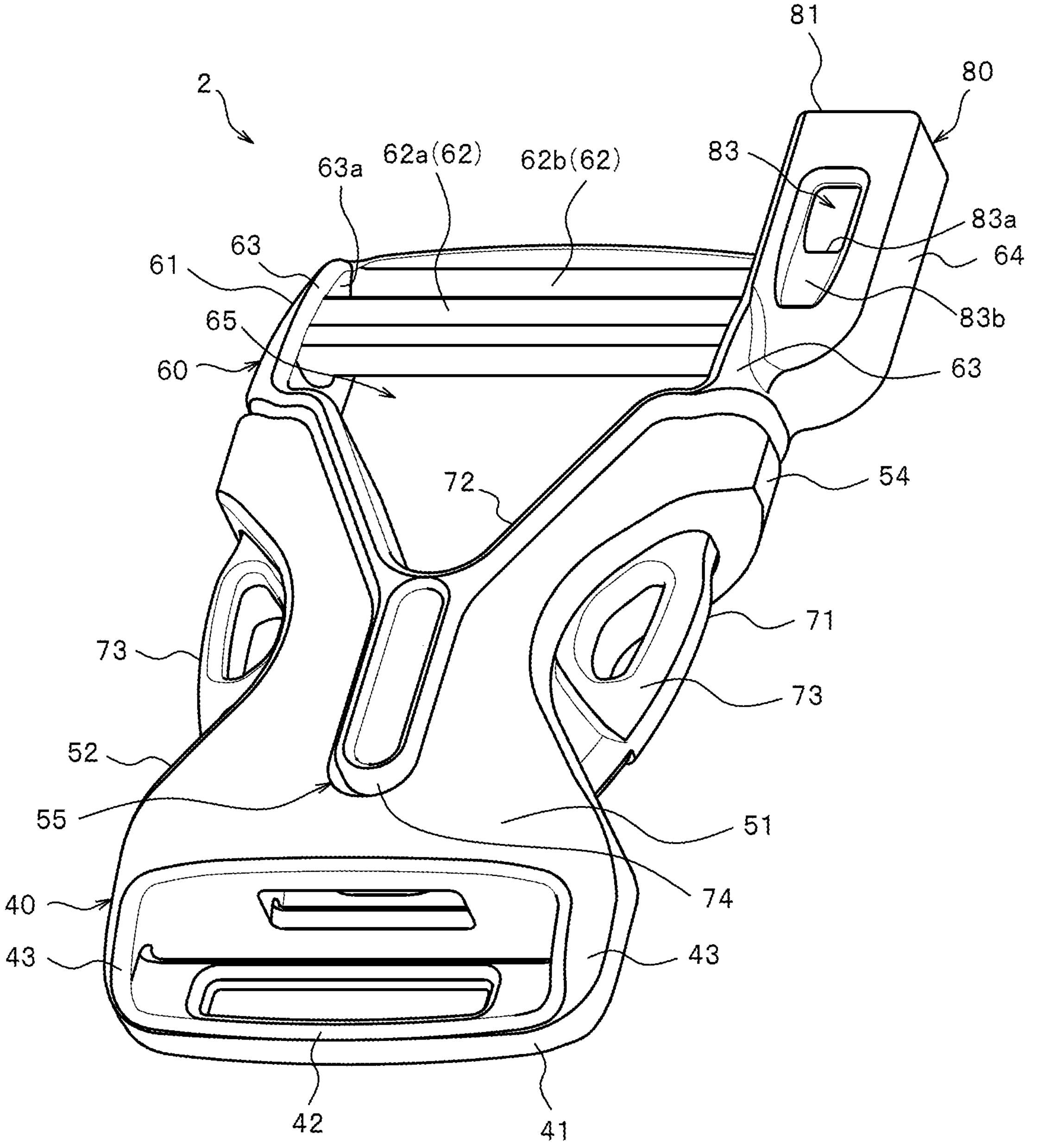
FIG. 12 is a perspective view schematically illustrating a tape attachment (buckle) according to a second embodiment of the invention.
Figure 13:
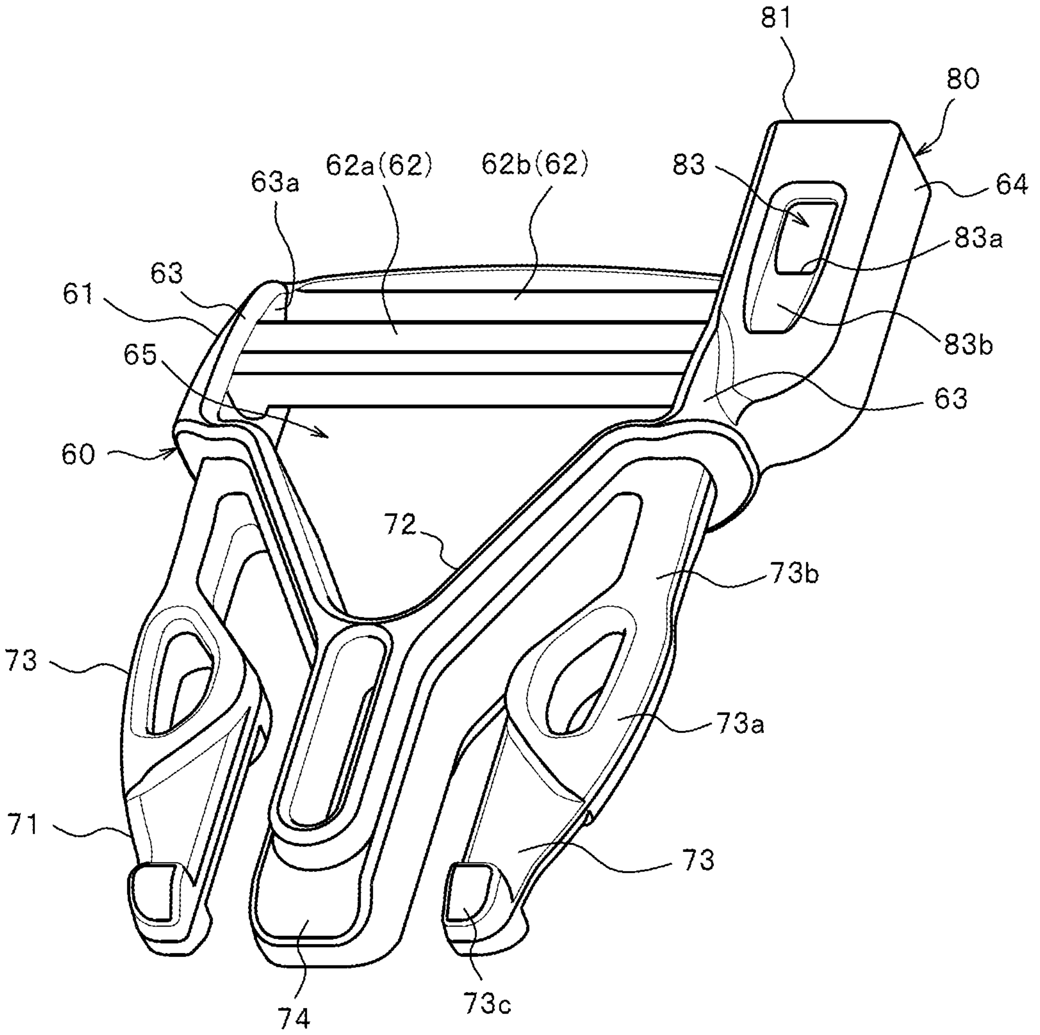
FIG. 13 is a perspective view schematically illustrating a plug in the tape attachment of the second embodiment.

FIG. 12 is a perspective view schematically illustrating a buckle (tape attachment) of a second embodiment. FIGS. 13 to 17 are schematic views of a plug in the buckle of the second embodiment as viewed from various directions.

A buckle 2 of the second embodiment includes a plug 60 made of a synthetic resin and attached to one tape and a socket 40 made of a synthetic resin and attached to the other tape. Although a part of the socket 40 of the second embodiment is formed in a different shape from the socket 40 included in the buckle 1 of the first embodiment described above, the socket 40 of the second embodiment is formed in substantially the same structure as the socket 40 included in the buckle 1 of the first embodiment. Therefore, the socket 40 of the second embodiment is denoted by the same reference numerals as those of the first embodiment described above, and a detailed description thereof will be omitted.

The plug 60 of the second embodiment includes a plug-side tape holder 61 to which the tape is attached and that hold the tape, and an engaging part 71 extending forward from the plug-side tape holder 61. The plug-side tape holder 61 is integrally provided with a whistle part 80 formed by assembling a guide member 85 illustrated in FIG. 19 to an inside of a whistle body 81.

The plug-side tape holder 61 includes two crossbar parts 62 extending along the width direction, a pair of left and right side support parts 63 to which left and right ends of each crossbar part 62 are connected, a mouthpiece portion 64 integrally provided with one (the right) side support part 63, and two tape insertion slots 65 formed between the left and right side support parts 63. Here, integrally providing the side support part 63 and the mouthpiece portion 64 means that the side support part 63 and the mouthpiece portion 64 are formed together so as to function in cooperation with each other so that a part of the side support part 63 functions as the mouthpiece portion 64 and a part of the mouthpiece portion 64 functions as the side support part 63.

The crossbar parts 62 includes a first crossbar part 62*a* disposed on a side close to the engaging part 71 and a second crossbar part 62*b* disposed on a side away from the engaging part 71. The tape insertion slots 65 includes a first tape insertion slot 65*a* provided between the engaging part 71 and the first crossbar part 62*a*, and a second tape insertion slot 65*b* provided between the first crossbar part 62*a* and the second crossbar part 62*b*. Similarly to a case of the plug-side tape holder 11 of the first embodiment described above, the plug-side tape holder 61 of the second embodiment holds the tape such that a length of the tape can be adjusted. The first crossbar part 62*a* and the second crossbar part 62*b* of the second embodiment each do not have an internal space unlike the first crossbar part 12*a* of the first embodiment described above, and are formed solid.

The left and right side support parts 63 are formed in parallel to each other along the longitudinal direction. The left and right side support parts 63 each has an inner side edge (inner side surface) 63*a* facing a central portion in the width direction of the plug 60. An internal space is provided in the right side support part 63. The left side support part 63 is formed solid.

Figure 14:
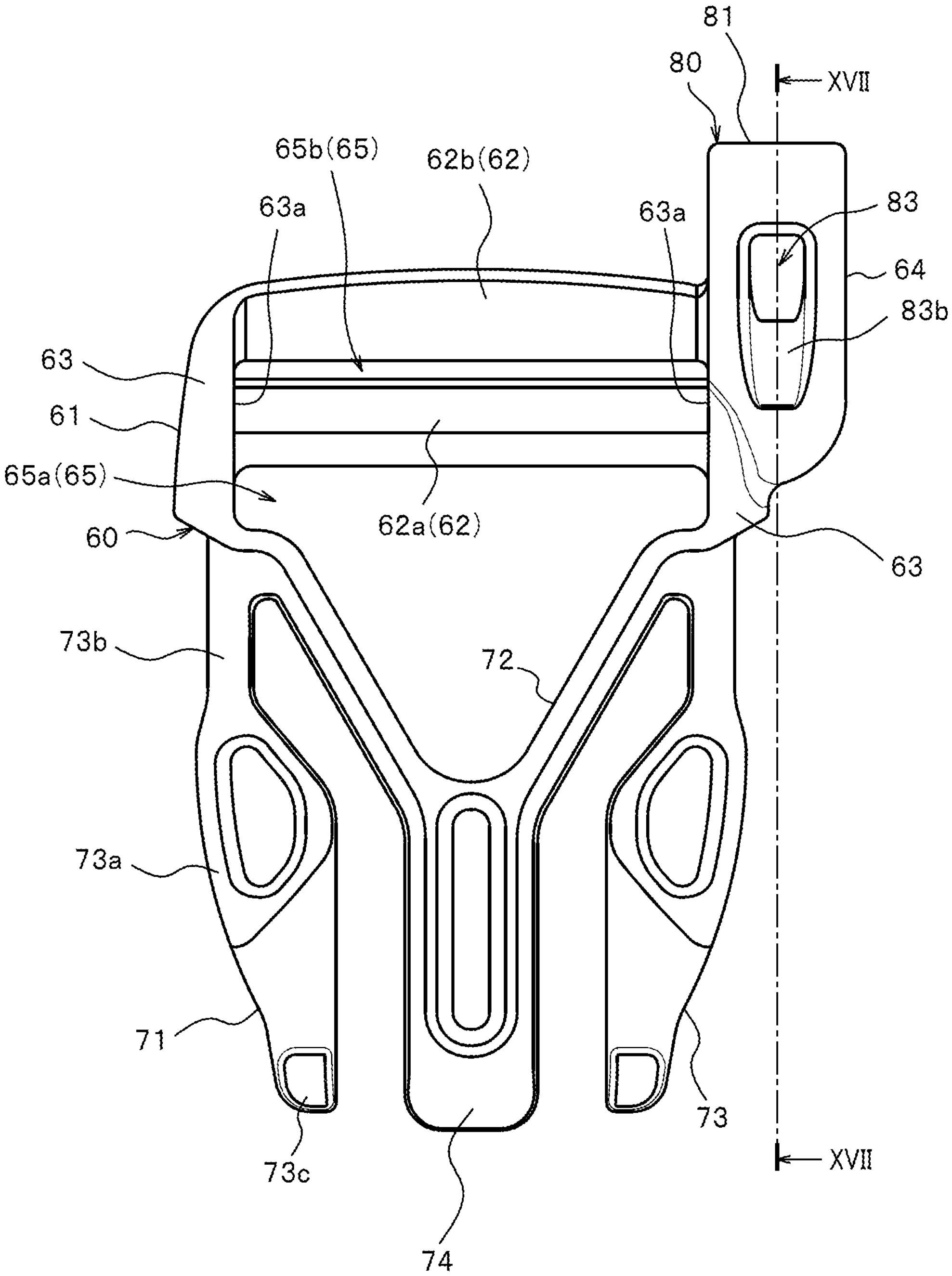
FIG. 14 is a plan view of the plug illustrated in FIG. 13.
Figure 15:
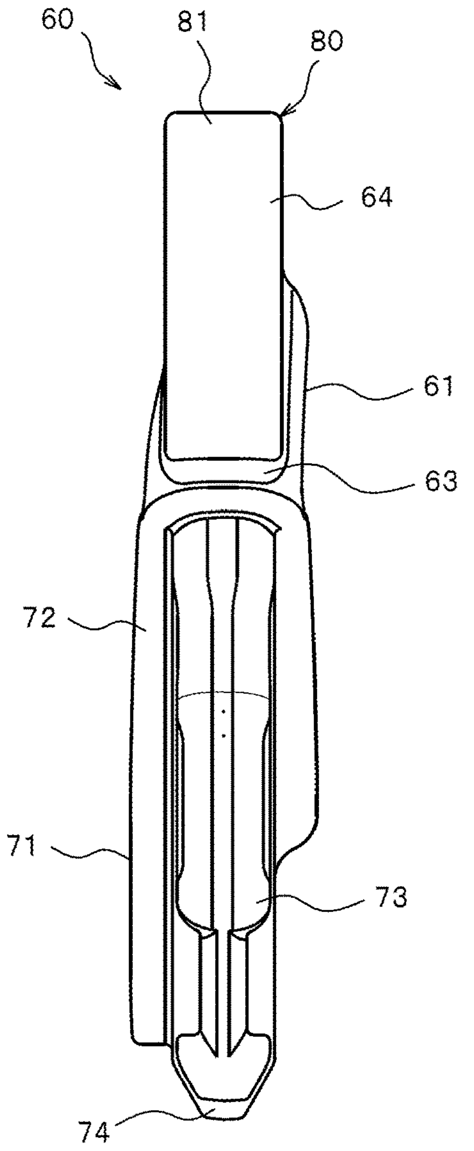
FIG. 15 is a side view of the plug illustrated in FIG. 13.
Figure 16:
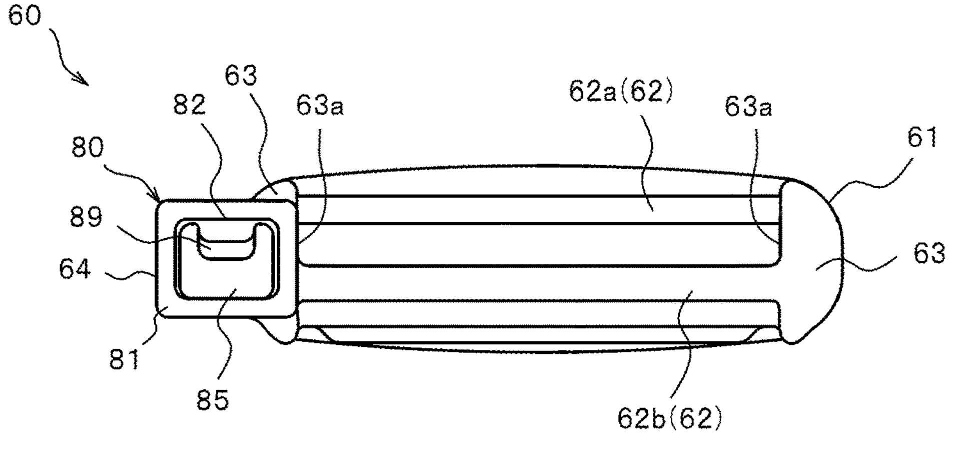
FIG. 16 is a schematic view (rear view) of the plug illustrated in FIG. 13 as viewed from one side in the front-back direction.

The mouthpiece portion 64 is formed thicker than the right side support part 63 so as to bulge outward in the width direction from the right side support part 63 in planar view of the plug 60 (FIG. 14). The mouthpiece portion 64 is formed such that a thickness dimension (dimension in the thickness direction) of the mouthpiece portion 64 is slightly smaller than that of the right side support part 63 in side view of the plug 60 (FIG. 15). The mouthpiece portion 64 extends rearward from a rear end portion of the second crossbar part 62*b*. A blowing hole 82 opened rearward is formed at a tip end portion (rear end portion) of the mouthpiece portion 64.

Figure 17:
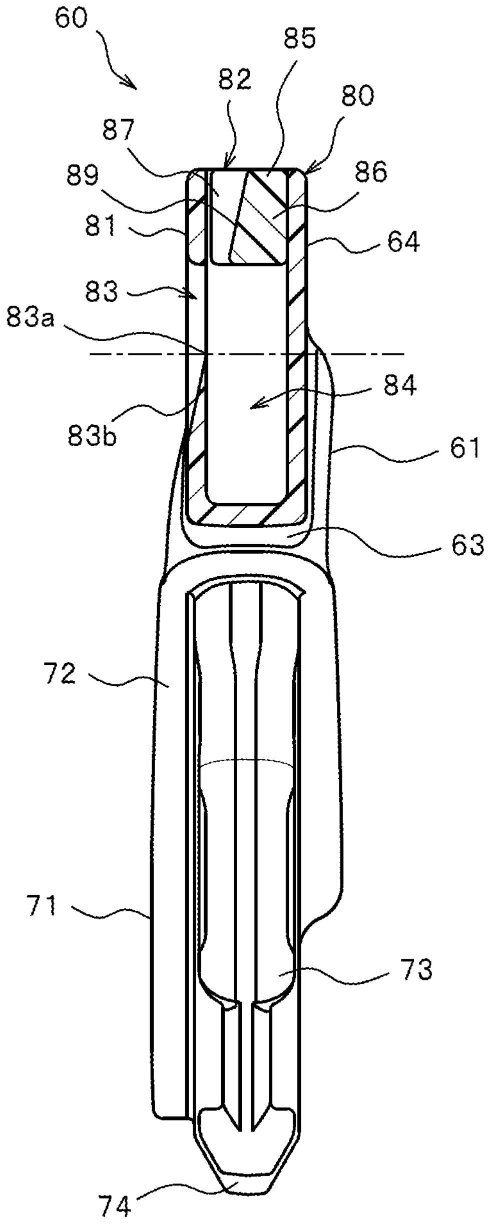
FIG. 17 is a cross-sectional view taken along line XVII-XVII in FIG. 14.
Figure 18:
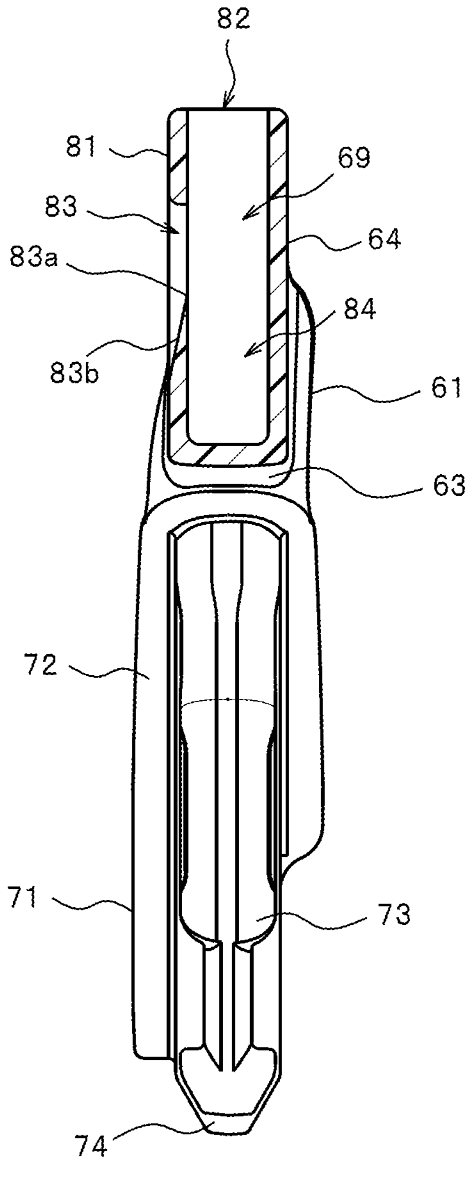
FIG. 18 is a cross-sectional view illustrating the plug in a state where a guide member is removed.
Figure 19:
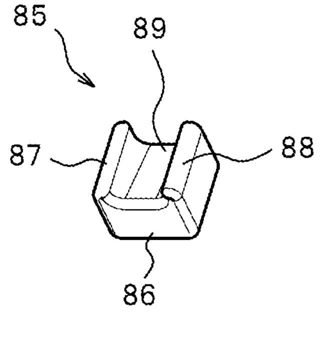
FIG. 19 is a perspective view schematically illustrating the guide member of the second embodiment.
Figure 20:
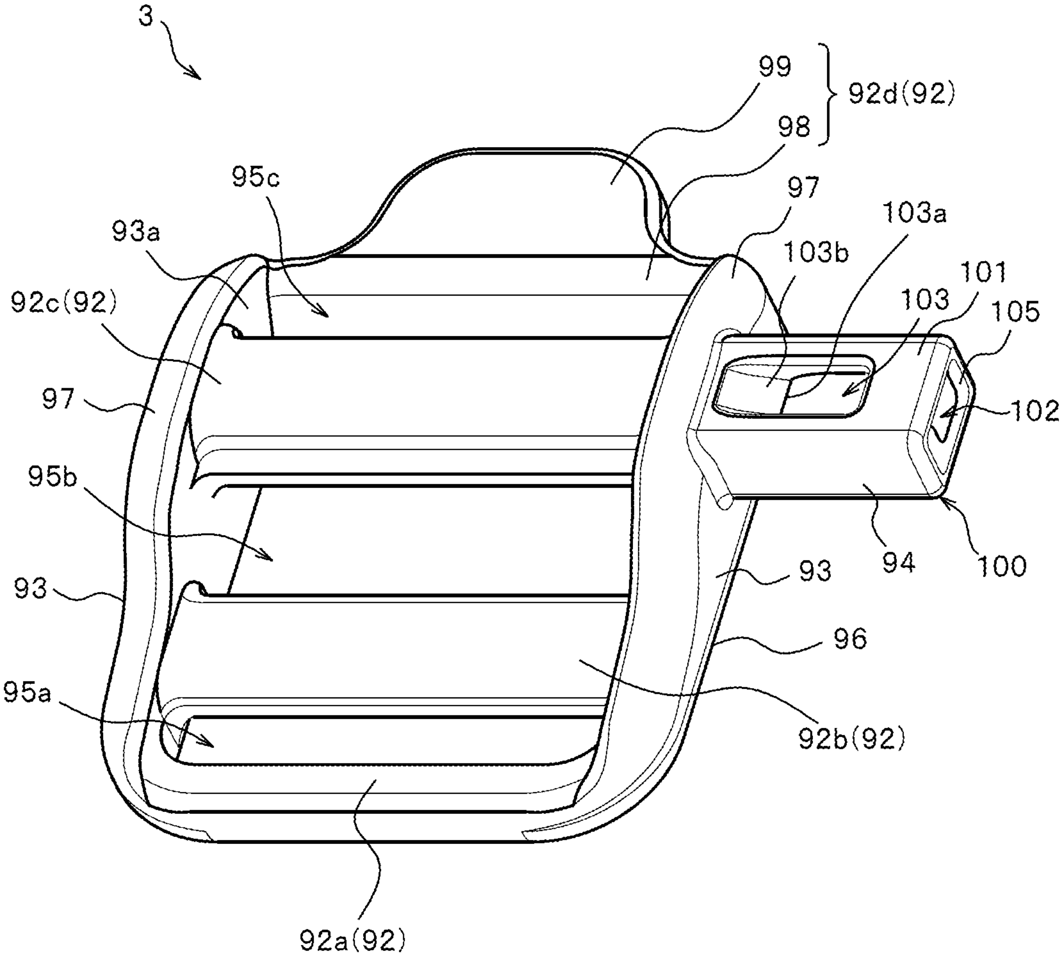
FIG. 20 is a perspective view schematically illustrating a tape attachment (adjuster) according to a third embodiment of the invention.

As illustrated in FIGS. 17 and 18, an internal space communicating with the blowing hole 82 of the mouthpiece portion 64 is continuously provided along the longitudinal direction in the right side support part 63 and the mouthpiece portion 64 which are integrally provided. The guide member 85 illustrated in FIG. 19 is mounted in the internal space. A discharge hole 83 of the whistle part 80 is provided on an upper surface portion of the mouthpiece portion 64. The discharge hole 83 communicates with the internal space provided in the side support part 63 and the mouthpiece portion 64.

The discharge hole 83 is provided with an edge portion 83*a* that divides a flow of air and an inclined surface 83*b* that is inclined upward from the edge portion 83*a* toward a front side along the longitudinal direction. The edge portion 83*a* is formed at a front end portion of an opening edge on an inner wall side of the discharge hole 83. The inclined surface 83*b* of the discharge hole 83 is inclined upward from the edge portion 83*a* toward the front side (see FIGS. 17 and 18). The inclined surface 83*b* is provided in a range in the longitudinal direction between a position of a front end portion of the first crossbar part 62*a* and a position of a rear end portion of the second crossbar part 62*b* in planar view of the plug 60 (FIG. 14). In addition, the inclined surface 83*b* of the discharge hole 83 is formed into a flat surface having a constant inclination angle with respect to the longitudinal direction from the edge portion 83*a* to an upper surface of the mouthpiece portion 64.

The whistle part 80 provided on the plug-side tape holder 61 includes the whistle body 81 having an internal space and the guide member 85 assembled to the whistle body 81.

The whistle body 81 of the second embodiment is formed of a part of the right side support part 63 and the mouthpiece portion 64 as an outer frame. In the whistle body 81, the blowing hole 82 and the discharge hole 83 are provided outside a position of the inner side edge 63*a* of the right side support part 63 in the width direction.

An internal space 69 continuous with the right side support part 63 and the mouthpiece portion 64 is formed along the longitudinal direction in the whistle body 81. The internal space 69 of the whistle body 81 includes a housing space portion in which the guide member 85 illustrated in FIG. 19 is housed and a hollow section 84 that increases a pressure of air blown in through the blowing hole 82 (see FIG. 18). The housing space portion is formed along the longitudinal direction from a position of the blowing hole 82 to a rear end portion of the discharge hole 83 (end portion opposite to the edge portion 83*a*).

The guide member 85 of the second embodiment includes a guide body 86, and a left side wall portion 87 and a right side wall portion 88 rising from left and right edge portions of the guide body 86, respectively (see FIG. 19). An inclined guide portion 89 is provided between the left side wall portion 87 and the right side wall portion 88. A length dimension of the guide member 85 is the same as a length dimension from the blowing hole 82 of the whistle body 81 to the rear end portion of the discharge hole 83.

As illustrated in FIG. 17, the inclined guide portion 89 of the guide member 85 has an inclined surface inclined upward from the blowing hole 82 of the whistle body 81 toward the discharge hole 83 (or toward the front side). The inclined surface of the inclined guide portion 89 is formed at an inclination angle at which the edge portion 83*a* of the discharge hole 83 is positioned on an extension line obtained by virtually extending the inclined surface straight.

Such a guide member 85 of the second embodiment is fixed to the housing space portion of the whistle body 81 by adhesion or welding. Thus, the whistle part 80 of the second embodiment is easily formed. In addition, in the second embodiment, similarly to a case of the first embodiment described above, since molds used for molding each of the whistle body 81 and the guide member 85 can be formed with a relatively simple structure, manufacturing costs of the buckle 2 can be reduced.

The hollow section 84 of the whistle part 80 is formed of a portion of the internal space 69 of the whistle part 80 on a downstream side of a position of the edge portion 83*a* of the discharge hole 83 with respect to the passage direction of blown air. Since the hollow section 84 is provided, as described in the first embodiment above, when air is blown in through the blowing hole 82, (A) increasing a pressure in the hollow section 84 and (B) discharging air in the hollow section 84 together with the blown air through the discharge hole 83 to reduce the pressure in the hollow section 84 can be alternately repeated, whereby a sound can be smoothly generated in the whistle part 80.

The engaging part 71 of the plug 60 in the second embodiment is formed in substantially the same structure as the engaging part 21 of the plug 10 in the first embodiment described above. Therefore, here, the description of the engaging part 71 of the second embodiment will be briefly made.

The engaging part 71 of the plug 60 in the second embodiment includes an engaging body 72 connected to the plug-side tape holder 61, a pair of left and right leg portions 73 extending forward from the engaging body 72, and a plug guide portion 74 disposed between the left and right leg portions 73. The engaging body 72 has a substantially V-shape in planar view of the plug 60 (FIG. 14). Each of the left and right leg portions 73 includes an operation portion 73*a* and a narrow width portion 73*b* connecting the operation portion 73*a* and the engaging body 72. Engaging protrusions 73*c* to be engaged with the socket 40 protrude upward and downward at a tip end portion of the operation portion 73*a*.

According to the buckle 2 of the second embodiment having the plug 60 and the socket 40 described above, since the whistle part 80 is provided in the plug-side tape holder 61 of the plug 60, air can be easily blown in through the blowing hole 82 provided at a rear end portion of the mouthpiece portion 64. In addition, a sound can be easily and smoothly generated from the whistle part 80 by blowing the air in.

Furthermore, since the blowing hole 82 and the discharge hole 83 of the whistle part 80 are disposed outside the position of the inner side edge 63*a* of the side support part 63 in the width direction, the blowing hole 82 and the discharge hole 83 can hardly be blocked by the tape similarly to a case of the first embodiment described above. In addition, also in the buckle 2 of the second embodiment, since the hollow section 84 of the whistle part 80 is formed using the side support part 63 of the plug 60, the buckle 2 having a whistle function can be downsized.

Note that in the second embodiment, the whistle part 80 is provided in the right side support part 63. However, in the second embodiment, the whistle part 80 may be provided in the left side support part 63, or may be provided in both the right and left side support parts 63.

Third Embodiment

FIGS. 20 to 24 are schematic views of an adjuster (tape attachment) of a third embodiment as viewed from various directions.

A tape attachment 3 of the third embodiment is an adjuster 3 capable of adjusting the overall lengths of the two tapes (not illustrated) by attaching the two tapes. More specifically, in the adjuster 3 of the third embodiment, a tape end portion of one tape (for example, a first tape) is wound around and fixed to one of crossbar parts 92, and the other tape (for example, a second tape) is wound around another crossbar part 92 and held in a folded-back state. As a result, the two tapes are held by the adjuster 3 such that lengths of the tapes are adjustable.

Figure 22:
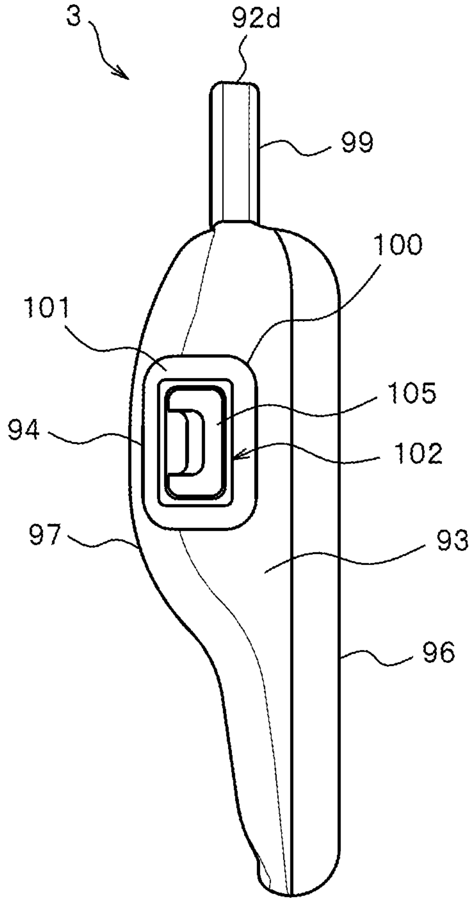
FIG. 22 is a side view of the tape attachment illustrated in FIG. 20.
Figure 23:
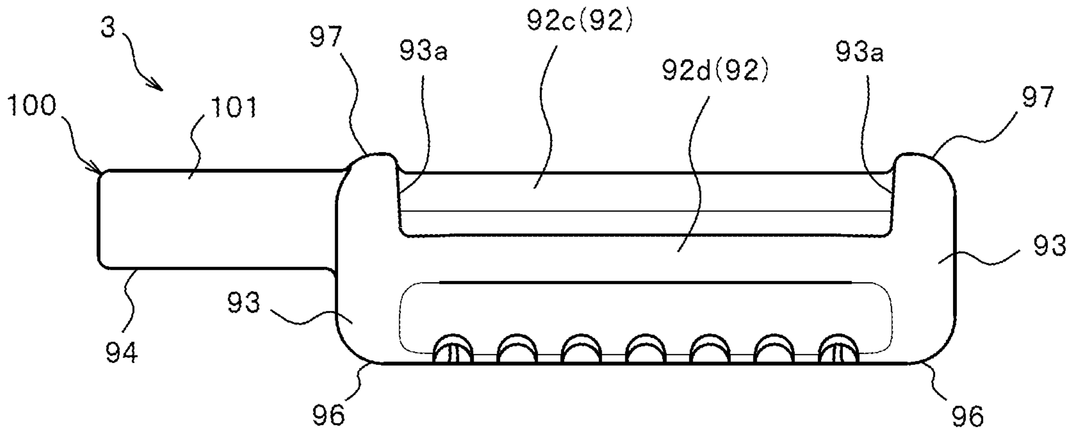
FIG. 23 is a schematic view (rear view) of the tape attachment illustrated in FIG. 20 as viewed from one side in the front-back direction.

The adjuster 3 of the third embodiment includes four crossbar parts 92, a pair of left and right side support parts 93 to which left and right end portions of each crossbar part 92 are connected, and a mouthpiece portion 94 protruding outward (rightward) in the width direction from one (the right) side support part 93. In this case, each of the left and right side support parts 93 has a lower end portion 96 extending substantially straight along the longitudinal direction and a raised portion 97 having a shape bulging upward in side view of the adjuster 3 (FIG. 22).

The adjuster 3 is integrally provided with a whistle part 100 that generates a sound by blowing air in by utilizing a part of an original shape of the adjuster 3. As described later, the whistle part 100 is formed by assembling a guide member 105 illustrated in FIG. 26 to an inside of a whistle body 101 described later of the adjuster 3.

The crossbar parts 92 provided in the adjuster 3 include a first crossbar part 92*a*, a second crossbar part 92*b*, a third crossbar part 92*c*, and a fourth crossbar part 92*d* disposed in this order from one end portion (front end portion) to the other end portion (rear end portion) in the longitudinal direction of the adjuster 3. Since the left and right end portions of each of the first crossbar part 92*a* to the fourth crossbar part 92*d* are connected and fixed to the left and right side support parts 93, each of the first crossbar part 92*a* to the fourth crossbar part 92*d* is supported by the left and right side support parts 93.

The first crossbar part 92*a* is disposed at the front end portion of the adjuster 3, and is formed thinnest among the four crossbar parts 92 in planar view of the adjuster 3. The second crossbar part 92*b* is spaced rearward from the first crossbar part 92*a*. The second crossbar part 92*b* is formed thicker than the first crossbar part 92*a* and thinner than the third crossbar part 92*c* in planar view of the adjuster 3. A first tape insertion slot 95*a* is provided between the first crossbar part 92*a* and the second crossbar part 92*b*.

The third crossbar part 92*c* is spaced rearward from the second crossbar part 92*b*. The third crossbar part 92*c* is connected to the raised portions 97 (in particular, upper end portions of the raised portions 97) of the left and right side support parts 93, and is disposed at an uppermost position among the four crossbar parts 92. A second tape insertion slot 95*b* is provided between the second crossbar part 92*b* and the third crossbar part 92*c*.

The fourth crossbar part 92*d* is disposed at the rear end portion of the adjuster 3. The fourth crossbar part 92*d* includes a bar body 98 extending in the width direction and a thin plate portion 99 integrally formed with the bar body 98 and extending rearward from the bar body 98. A third tape insertion slot 95*c* is provided between the third crossbar part 92*c* and the fourth crossbar part 92*d*.

Figure 24:
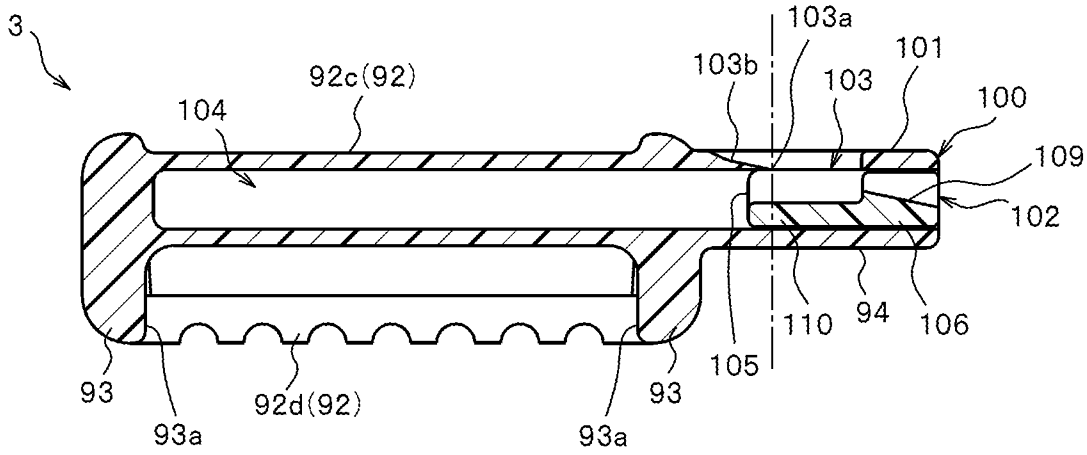
FIG. 24 is a cross-sectional view taken along line XXIV-XXIV in FIG. 21.
Figure 25:
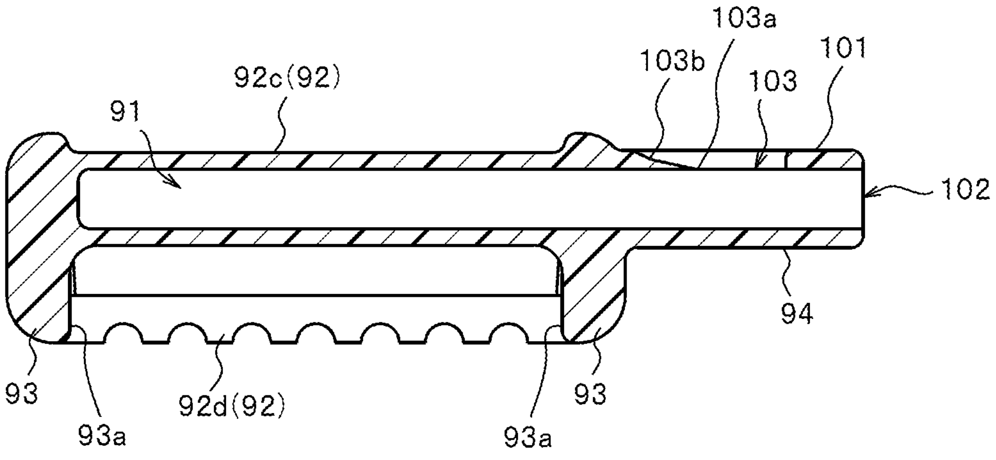
FIG. 25 is a cross-sectional view illustrating the tape attachment in a state where a guide member is removed.

In the third crossbar part 92*c* of the adjuster 3, an internal space 91 forming a part of a hollow section 104 of the whistle part 100 is continuously formed along the width direction (see FIGS. 24 and 25). The internal space 91 of the third crossbar part 92*c* communicates with an internal space 91 provided in the right side support part 93. The internal space 91 of the third crossbar part 92*c* is formed continuously up to a position of an inner side edge 93*a* (inner side surface) of the left side support part 93 in the width direction. The first crossbar part 92*a*, the second crossbar part 92*b*, and the fourth crossbar part 92*d* are formed solid without the internal space 91.

The left and right side support parts 93 are formed in parallel to each other along the longitudinal direction. The left and right side support parts 93 are provided continuously from a position of a front end portion of the first crossbar part 92*a* to a position of a rear end portion of the fourth crossbar part 92*d* in the longitudinal direction. Each of the left and right side support parts 93 has the inner side edge 93*a* (inner side surface) disposed opposite to each other and an outer edge (outer side surface) facing outward in the width direction. An internal space 91 is provided in the right side support part 93.

The mouthpiece portion 94 protrudes outward (rightward) in the width direction from the right side support part 93. The mouthpiece portion 94 has a shape tapered outward in the width direction such that a tip end portion is thinner than a base end portion. The mouthpiece portion 94 protrudes rightward from a position corresponding to a connecting position to which the third crossbar part 92*c* of the side support part 93 is connected. As a result, an internal space 91 provided in the mouthpiece portion 94, the internal space 91 provided in the right side support part 93, and the internal space 91 provided in the third crossbar part 92*c* can stably communicate with one another.

Figure 26:
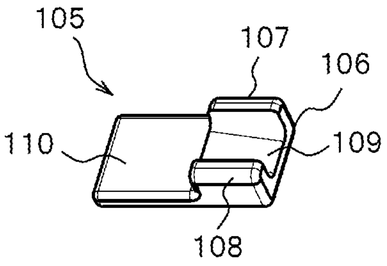
FIG. 26 is a perspective view schematically illustrating the guide member of the third embodiment.
Figure 27:
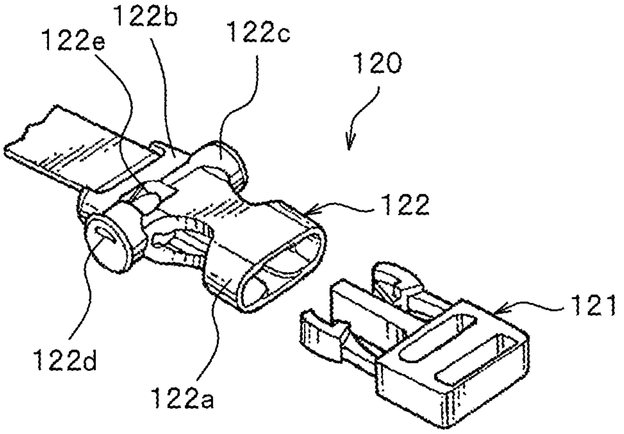
FIG. 27 is a perspective view illustrating a conventional buckle with a whistle.

A blowing hole 102 for air is formed at the tip end portion of the mouthpiece portion 94. As illustrated in FIG. 25, the mouthpiece portion 94 and the right side support part 93 are provided with the internal space 91 that communicates with the blowing hole 102 of the mouthpiece portion 94 and the internal space 91 of the third crossbar part 92*c* along the width direction. The guide member 105 illustrated in FIG. 26 is mounted in the internal space 91 of the mouthpiece portion 94.

A discharge hole 103 that communicates with the internal space 91 of the mouthpiece portion 94 and discharges air is provided on an upper surface portion of the mouthpiece portion 94. The discharge hole 103 is provided with an edge portion 103*a* that divides a flow of air into upper and lower portions, and an inclined surface 103*b* that is inclined upward along the width direction from the edge portion 103*a*.

The whistle part 100 provided in the adjuster 3 of the third embodiment includes the whistle body 101 having the internal space 91 and the guide member 105 assembled to the whistle body 101.

The whistle body 101 of the third embodiment is formed of the third crossbar part 92*c*, a part of the right side support part 93, and the mouthpiece portion 94. The blowing hole 102 and the discharge hole 103 described above are provided outside the right side support part 93 in the width direction in the whistle body 101. Thus, even when the two tapes are held by the adjuster 3 as described above, the blowing hole 102 and the discharge hole 103 can hardly be blocked by the tapes.

The internal space 91 continuous with the third crossbar part 92*c*, the side support part 93, and the mouthpiece portion 94 is formed along the width direction in the whistle body 101. The internal space 91 of the whistle body 101 includes a housing space portion in which the guide member 105 illustrated in FIG. 26 is housed and the hollow section 104 that increases a pressure of air blown in through the blowing hole 102 (see FIG. 24). The housing space portion is formed along the width direction from a position of the blowing hole 102 to an end portion of the discharge hole 103 on a side opposite to the edge portion 103*a*.

The guide member 105 of the third embodiment includes a guide body 106, a front wall portion 107 and a rear wall portion 108 rising from a front end portion and a rear end portion of the guide body 106, respectively, and an extending piece portion 110 extending in the width direction from the guide body 106. The guide body 106 is provided with an inclined guide portion 109 disposed between the front wall portion 107 and the rear wall portion 108. As illustrated in FIG. 24, the inclined guide portion 109 has an inclined surface inclined upward from the blowing hole 102 of the whistle body 101 toward the discharge hole 103.

Such a guide member 105 of the third embodiment is fixed to the housing space portion of the whistle body 101 by adhesion or welding. Thus, the whistle part 100 of the third embodiment is easily formed. In addition, since molds used for molding the whistle body 101 and the guide member 105 can be formed with a relatively simple structure, manufacturing costs of the adjuster 3 can be reduced.

The hollow section 104 of the whistle part 100 is formed of a portion of the internal space 91 of the whistle part 100 on a downstream side of a position of the edge portion 103*a* of the discharge hole 103 with respect to the passage direction of blown air. Since the hollow section 104 is provided, when air is blown in through the blowing hole 102, a sound can be smoothly generated by the whistle part 100.

In the adjuster 3 of the third embodiment, the whistle part 100 that generates a sound can be easily provided without increasing a size of the entire adjuster 3. Therefore, the adjuster 3 having a whistle function can be downsized. In addition, also in the third embodiment, a sound can be easily and smoothly generated from the whistle part 100 by blowing air in through the blowing hole 102 provided in the whistle part 100.

Furthermore, in the third embodiment, since the blowing hole 102 and the discharge hole 103 of the whistle part 100 are disposed outside the side support part 93 in the width direction, the blowing hole 102 and the discharge hole 103 can hardly be blocked by the tape held by the adjuster 3.

Note that in the third embodiment, the whistle part 100 is formed in the third crossbar part 92*c* of the adjuster 3. However, in the third embodiment, the whistle part 100 may be formed in the crossbar part 92 other than the third crossbar part 92*c* of the adjuster 3. In addition, in the third embodiment, the whistle part 100 may be provided in two or more crossbar parts 92 of the adjuster 3.

In the tape attachments 1 to 3 of the first to third embodiments described above, the discharge holes 33, 83, 103 discharging air are provided on the upper surface portions of the whistle bodies 31, 81, 101 serving as outer frames. However, in the invention, a position where the discharge hole is formed is not particularly limited, and the discharge hole may be provided, for example, on the lower surface portion, the side wall portion of a front side, or the side wall portion of a rear side in the whistle body. For example, in the first embodiment described above, even when the discharge hole is provided on the lower surface portion of the whistle body, the discharge hole can hardly be blocked by the tape.

In addition, in the first to third embodiments described above, the discharge holes 33, 83, 103 of the whistle parts 30, 80, 100 are provided outside the positions of the inner side edges 13*a*, 63*a*, 93*a* of the left and right side support parts 13, 63, 93 in the width direction in planar view of the tape attachments 1 to 3. However, in the invention, the discharge hole of the whistle part may be provided inside the positions of the inner side edges of the left and right side support parts in the width direction. For example, in the tape attachment of the first embodiment described above, the discharge hole of the whistle part may be provided on the lower surface portion of the first crossbar part 12*a* disposed inside the inner side edge 13*a* of the right side support part 13. In this case, although the tape wound around and folded back at the first crossbar part 12*a* covers the upper surface portion of the first crossbar part 12*a*, the lower surface portion of the first crossbar part 12*a* is hardly covered directly by two tape portions of the tape folded back at the first crossbar part 12*a*.

Therefore, the discharge hole provided on the lower surface portion of the first crossbar part 12*a* can hardly be blocked by the tape.

Furthermore, in a case of the first to third embodiments described above, two openings of the blowing holes 32, 82, 102 and the discharge holes 33, 83, 103 are provided as openings of the whistle parts 30, 80, 100, respectively. However, in the invention, an opening (hole) other than the blowing hole and the discharge hole may be provided in the whistle part as long as a pressure of air can be appropriately increased in the hollow section of the whistle part. For example, in the invention, in order to facilitate molding of the whistle part using a mold, an opening formed for inserting a part of the mold may be formed in a part of the whistle part so as to communicate with the internal space.

Furthermore, although the whistle parts 30, 80, 100 are provided in the buckles 1, 2 or the adjuster 3 in an inseparable manner in the first to third embodiments described above, a portion including the whistle part that generates a sound may be provided in the tape attachment of the invention in a detachable manner from the tape attachment. An example of such a tape attachment is a tape attachment to which a portion including the whistle part is detachably attached in a snap-on manner.

Furthermore, in the first to third embodiments described above, the whistle parts 30, 80, 100 are formed by fixing the guide members 35, 85, 105 to the whistle bodies 31, 81, 101 serving as outer frames. However, in the invention, the whistle part provided in the tape attachment may be formed by, for example, assembling a first component integrally formed with the guide member (e.g., a portion other than the upper surface portion of the whistle part of the first embodiment) and a second component formed of a portion other than the first component of the whistle part (upper surface portion of the whistle part of the first embodiment) to each other. Furthermore, the whistle part provided in the tape attachment may have a structure formed by combining three or more components.

In the tape attachment of the invention, the hollow section that increases a pressure of air may be provided in at least a part of the crossbar part and the pair of side support parts. That is, the hollow section may be provided in a part or the whole of the crossbar part, may be provided in a part or the whole of the side support part, or may be provided in a part or the whole of each of the crossbar part and the side support part.

REFERENCE SIGNS LIST

1, 2 buckle (tape attachment)
3 adjuster (tape attachment)
10 plug
11 plug-side tape holder
12 crossbar part
12*a* first crossbar part
12*b* second crossbar part
13 side support part
13*a* inner side edge (inner side surface)
14 mouthpiece portion (blowing part)

14*a* engaged hole
15 tape insertion slot
15*a* first tape insertion slot
15*b* second tape insertion slot
19 internal space
19*a* first space
19*b* second space
19*c* stepped part
21 engaging part
22 engaging body
23 leg portion
23*a* operation portion
23*b* narrow width portion
23*c* engaging protrusion
24 plug guide portion
24*a* protrusion portion
30 whistle part
31 whistle body (outer frame portion)
32 blowing hole
33 discharge hole
33*a* edge portion
33*b* inclined surface
34 hollow section (resonance chamber)
35 guide member
36 bottom surface portion
36*a* engaging protrusion
37 front wall portion
38 rear wall portion
39 inclined guide portion
40 socket
41 socket-side tape holder
42 crossbar part
43 side support part
51 housing portion
52 upper plate portion
53 lower plate portion
54 side wall portion
55 slit
60 plug
61 plug-side tape holder
62 crossbar part
62*a* first crossbar part
62*b* second crossbar part
63 side support part
63*a* inner side edge (inner side surface)
64 mouthpiece portion
65 tape insertion slot
65*a* first tape insertion slot
65*b* second tape insertion slot
69 internal space
71 engaging part
72 engaging body
73 leg portion
73*a* operation portion
73*b* narrow width portion
73*c* engaging protrusion
74 plug guide portion
80 whistle part
81 whistle body
82 blowing hole
83 discharge hole
83*a* edge portion
83*b* inclined surface
84 hollow section
85 guide member
86 guide body
87 left side wall portion
88 right side wall portion
89 inclined guide portion
91 internal space
92 crossbar part
92*a* first crossbar part
92*b* second crossbar part
92*c* third crossbar part
92*d* fourth crossbar part
93 side support part
93*a* inner side edge
94 mouthpiece portion
95*a* first tape insertion slot
95*b* second tape insertion slot
95*c* third tape insertion slot
96 lower end portion
97 raised portion
98 bar body
99 thin plate portion
100 whistle part
101 whistle body
102 blowing hole
103 discharge hole
103*a* edge portion
103*b* inclined surface
104 hollow section
105 guide member
106 guide body
107 front wall portion
108 rear wall portion
109 inclined guide portion
110 extending piece portion

The invention claimed is:

1. A tape attachment configured to be attached to at least one tape, the tape attachment comprising:

a crossbar part extending along a first direction and brought into contact with a tape of the at least one tape when the tape attachment is attached to the tape;

a pair of side support parts connected to both ends of the crossbar part and supporting the crossbar part;

a whistle part having a blowing hole and a discharge hole for air; and a tape insertion slot formed between the side support parts of the pair of side support parts, wherein:

the whistle part includes a hollow section in which a pressure of air blown in through the blowing hole is increased, the hollow section is disposed on a downstream side of the discharge hole in an air passage direction, and in a second direction orthogonal to the first direction, the hollow section is provided in at least a part of a) the crossbar part disposed outside the tape insertion slot and b) portions of the pair of side support parts, the portions supporting the crossbar part disposed outside the tape insertion slot.

2. The tape attachment according to claim 1, wherein:

the pair of side support parts include inner side edges facing each other in planar view of the tape attachment, the blowing hole and the discharge hole are disposed outside a position of the inner side edge of the side support part in the first direction, and at least a part of the hollow section is provided in at least a part of the side support part.

3. The tape attachment according to claim 1, wherein:

a mouthpiece portion protrudes from one of the pair of side support parts, and the mouthpiece portion is provided with the blowing hole and at least a part of the discharge hole.

4. The tape attachment according to claim 1, wherein the crossbar part is a first crossbar part, the tape attachment further comprising a second crossbar part brought into contact with the tape when the tape attachment is attached to the tape, the first crossbar part and the second crossbar part defining the tape insertion slot therebetween.

5. The tape attachment according to claim 1, wherein:

the whistle part is formed by assembling at least two components to each other.

6. The tape attachment according to claim 5, wherein:

the whistle part includes a whistle body having the blowing hole and the discharge hole, and a guide member formed separately from the whistle body and assembled to an inside of the whistle body, and the guide member includes an inclined guide portion guiding air blown in through the blowing hole toward the discharge hole.

7. The tape attachment according to claim 6, wherein:

the guide member includes at least one engaging protrusion or at least one engaged hole, and the whistle body includes at least one engaged hole with which the engaging protrusion of the guide member is engaged or at least one engaging protrusion engaging with the engaged hole of the guide member.

8. The tape attachment according to claim 1, wherein:

the tape attachment is a buckle separably coupling two portions of the tape, or an adjuster capable of adjusting a length of the tape.

9. The tape attachment according to claim 1, further comprising a pair of tape insertion slots comprising the tape insertion slot.

* * * * *